US009542723B2

(12) United States Patent
Kirmse et al.

(10) Patent No.: US 9,542,723 B2
(45) Date of Patent: *Jan. 10, 2017

(54) ARCHITECTURES AND METHODS FOR CREATING AND REPRESENTING TIME-DEPENDENT IMAGERY

(71) Applicant: Google Inc., Mountain View, CA (US)

(72) Inventors: Andrew Kirmse, Redwood City, CA (US); Reuel William Nash, Austin, TX (US); Steve Zelinka, Los Gatos, CA (US)

(73) Assignee: Google Inc., Mountain View, CA (US)

(*) Notice: Subject to any disclaimer, the term of this patent is extended or adjusted under 35 U.S.C. 154(b) by 28 days.

This patent is subject to a terminal disclaimer.

(21) Appl. No.: 14/754,815

(22) Filed: Jun. 30, 2015

(65) Prior Publication Data

US 2016/0005147 A1 Jan. 7, 2016

Related U.S. Application Data

(63) Continuation of application No. 13/939,628, filed on Jul. 11, 2013, now Pat. No. 9,099,057, which is a
(Continued)

(51) Int. Cl.
G06K 9/36 (2006.01)
G06T 3/40 (2006.01)
(Continued)

(52) U.S. Cl.
CPC .......... G06T 3/40 (2013.01); G06F 17/30241 (2013.01); G06K 9/00476 (2013.01); G06K 9/46 (2013.01);
(Continued)

(58) Field of Classification Search
CPC ............. G06K 9/00; G06T 11/00; G06F 17/00
(Continued)

(56) References Cited

U.S. PATENT DOCUMENTS 5,912,165 A 6/1999 Cabib et al.
6,075,595 A 6/2000 Malinen
(Continued)

FOREIGN PATENT DOCUMENTS

EP 1703426 A1 9/2006

OTHER PUBLICATIONS

Wu, et al, "Automatic Alignment of Large-scale Aerial Rasters to Road-maps" Proceedings of the 15th international Symposium on Advances in Geographic information Systems, 2007.
(Continued)

Primary Examiner — Abolfazl Tabatabai
(74) Attorney, Agent, or Firm — Lerner, David, Littenberg, Krumholz & Mentlik, LLP

(57) ABSTRACT

Aspects of the technology pertain to geographical image processing of time-dependent imagery. Various assets acquired at different times are stored and processing according to acquisition date in order to generate one or more image tiles for a geographical region of interest. The different image tiles are sorted based on asset acquisition date. Multiple image tiles for the same region of interest may be available. In response to a user request for imagery as of a certain date, one or more image tiles associated with assets from prior to that date are used to generate a time-based geographical image for the user.

20 Claims, 19 Drawing Sheets

Related U.S. Application Data continuation of application No. 13/619,183, filed on Sep. 14, 2012, now Pat. No. 8,520,977, which is a continuation of application No. 13/285,250, filed on Oct. 31, 2011, now Pat. No. 8,295,550, which is a continuation of application No. 12/231,290, filed on Aug. 28, 2008, now Pat. No. 8,077,918.

(51) Int. Cl.

| | | |
|---|---|---|
| *G06F 17/30* | (2006.01) | |
| *G06T 1/00* | (2006.01) | |
| *G09G 5/377* | (2006.01) | |
| *G06K 9/00* | (2006.01) | |
| *G06K 9/46* | (2006.01) | |
| *G06T 11/20* | (2006.01) | |
| *G06T 11/60* | (2006.01) | |
| *G06T 17/00* | (2006.01) | |
| *H04N 5/225* | (2006.01) | |

(52) U.S. Cl.
CPC ............ *G06T 1/0085* (2013.01); *G06T 11/20* (2013.01); *G06T 11/60* (2013.01); *G09G 5/377* (2013.01); *G06K 2009/4666* (2013.01)

(58) Field of Classification Search
USPC ........ 382/100, 103, 284; 348/169, 170, 171, 348/172, 352; 345/418; 702/5; 705/7.34; 707/919, 999.104, 999.107, 999.203; 725/35
See application file for complete search history.

(56) References Cited

U.S. PATENT DOCUMENTS

| | | | |
|---|---|---|---|
| 6,373,568 B1* | 4/2002 | Miller ...................... | G01J 1/08 356/326 |
| 7,009,699 B2 | 3/2006 | Wolleschensky et al. | |
| 7,225,207 B1* | 5/2007 | Ohazama .......... | G06F 17/30241 |
| 7,353,114 B1* | 4/2008 | Rohlf ................. | G06F 17/2247 702/5 |
| RE41,428 E | 7/2010 | Mayer et al. | |
| 8,077,918 B2 | 12/2011 | Kirmse et al. | |
| 8,103,081 B2 | 1/2012 | Gossage et al. | |
| 8,339,394 B1 | 12/2012 | Lininger | |
| 9,099,057 B2* | 8/2015 | Kirmse ............. | G06F 17/30241 |
| 2001/0014185 A1 | 8/2001 | Chitradon et al. | |
| 2003/0142523 A1 | 7/2003 | Biacs | |
| 2006/0041591 A1 | 2/2006 | Rhoads | |
| 2006/0181546 A1 | 8/2006 | Jung et al. | |
| 2006/0208926 A1 | 9/2006 | Poor et al. | |
| 2007/0096945 A1 | 5/2007 | Rasmussen et al. | |
| 2007/0136259 A1 | 6/2007 | Dorfman et al. | |
| 2007/0250477 A1 | 10/2007 | Bailly | |
| 2008/0016472 A1 | 1/2008 | Rohlf et al. | |
| 2008/0077597 A1 | 3/2008 | Butler | |
| 2008/0158366 A1 | 7/2008 | Jung et al. | |
| 2008/0174593 A1 | 7/2008 | Ham et al. | |
| 2009/0063424 A1 | 3/2009 | Iwamura et al. | |
| 2009/0303251 A1 | 12/2009 | Balogh et al. | |
| 2011/0007094 A1 | 1/2011 | Nash et al. | |

OTHER PUBLICATIONS

Barclay, et al., "Microsoft TerraServer: A Spatial Data Warehouse", 2005.
Bauman, "Raster Databases", 2007.
Ghemawat, et al. "The Google File System", 2003.
U.S. Appl. No. 11/415,960, Zelirilca et al., "Coverage Mask Generation for Large Images", filed May 2, 2006.
U.S. Appl. No. 11/437,553, "Large-Scale Image Processing Using Mass Parallelizallon Techniques", filed May 19, 2006.
U.S. Appl. No. 11/473,461, Kirmse et al, "Hierarchical Spatial Data Structure and 3D Index Data Verseoning for Generating Packet Data", filed Jun. 22, 2006.
Scranton et al., "Sky in Google Earth: The Next Frontier in Astronomical Data Discovery and Visualization", http://earth.google.com/sky/, Sep. 10, 2007.
International Search Report, PCT/US09/04817, mailed Oct. 8, 2009.
http://ieeexplore.ieee.org/search retrieved from the Internet on Sep. 7, 2010.
Potmesil M., "Maps alive: Viewing geospacial information on the WWW", Computer Systems and ISDN Systems, North Holland Publishing, Amsterdam, NL, vol. 29, No. 8-13, Sep. 1, 1997 (Sep. 1, 1997), pp. 1327-1342, XP004095328.
Nan L. et al., "A spatial-temporal system for dynamic cadastral management," Journal of Environmental Management, Academic Press, London, GB, vol. 78, No. 4, Mar. 1, 2006 (Mar. 1, 2006), pp. 373-381, retrieved on Mar. 1, 2006.
Rocchini D. et al., "Landscape change and the dynamics of open formations in a natural reserve," Landscape and urban Planning, Elsevier, vol. 77, No. 1-2, Jun. 15, 2006 (Jun. 15, 2006), pp. 167-177, retrieved on Jun. 15, 2006.
The extended European search report, Application No. EP 09 81 0353.4, PCT/US2009004817, mail date, Dec. 5, 2011.
Gail Langran, Nicholas R. Chrisman: "A Framework for temporal Geographic Information", University of Washington Cartographica, vol. 25, No. 3, Dec. 31, 1988 (Dec. 31, 1988), pp. 1-14, Retrieved from the Internet: URL:http://www.unigis.ac.at/fernstudien/unigis_professional/lehrgangs_cd_1.../module//modul2/Temporal%20Geographic%20Information.pdf.
European Examination Report for Application No. 09810353.4 dated Oct. 18, 2012.
Vlahakis et al., "Archeoguide: An Augmented Reality Guide for Archaeological Sites", IEEE Computer Graphics and Applications, Sep./Oct. 2002, pp. 52-60.
Naval, "Three-Dimensional Documentation of Complex Heritage Structures", Interpretive Enviornments, Apr.-Jun. 2000, pp. 52-55.
Magnenat-Thalmann et al., "Real-Time Animation of Ancient Roman Sites", 2006, pp. 19-30.
Conti et al., "DentroTrento—A virtual Walk Across history", 2006, pp. 318-321.
European Office Action for Application No. 09810353 dated Oct. 9, 2013.
U.S. Appl. No. 13/854,314, filed Apr. 1, 2013.
U.S. Appl. No. 13/870,419, filed Apr. 25, 2013.
Bhagavathy et al., "Modeling and Detection of Geospatial Objects Using Texture Motifs" 3706 IEEE Transactions on Geoscience and Remote Sensing. vol. 44, No. 12, Dec. 2006.

* cited by examiner

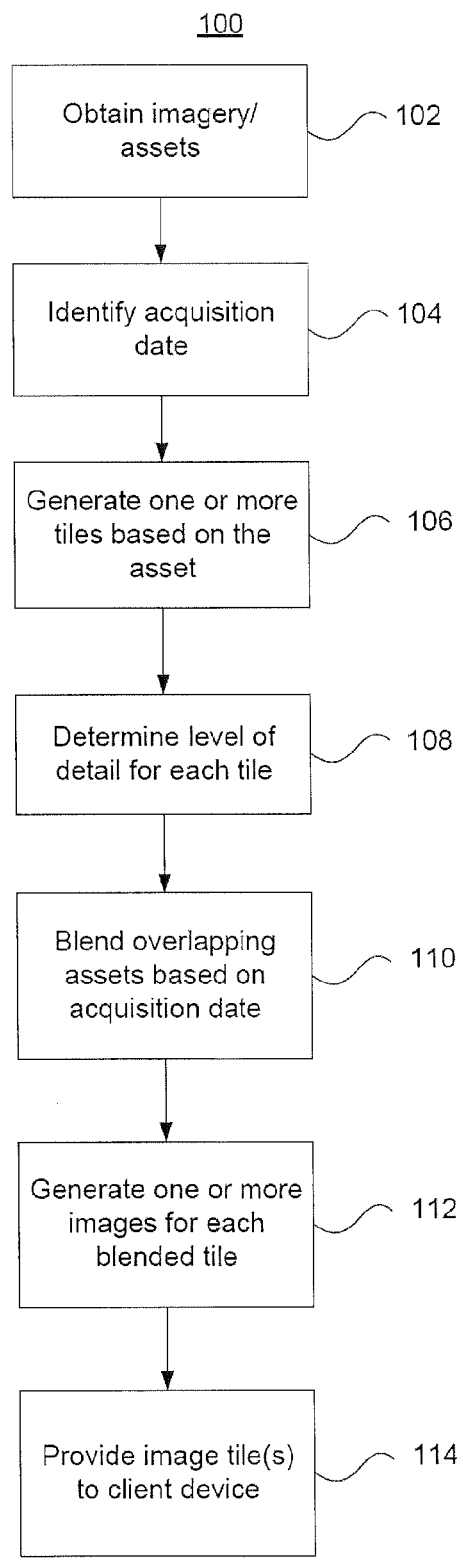

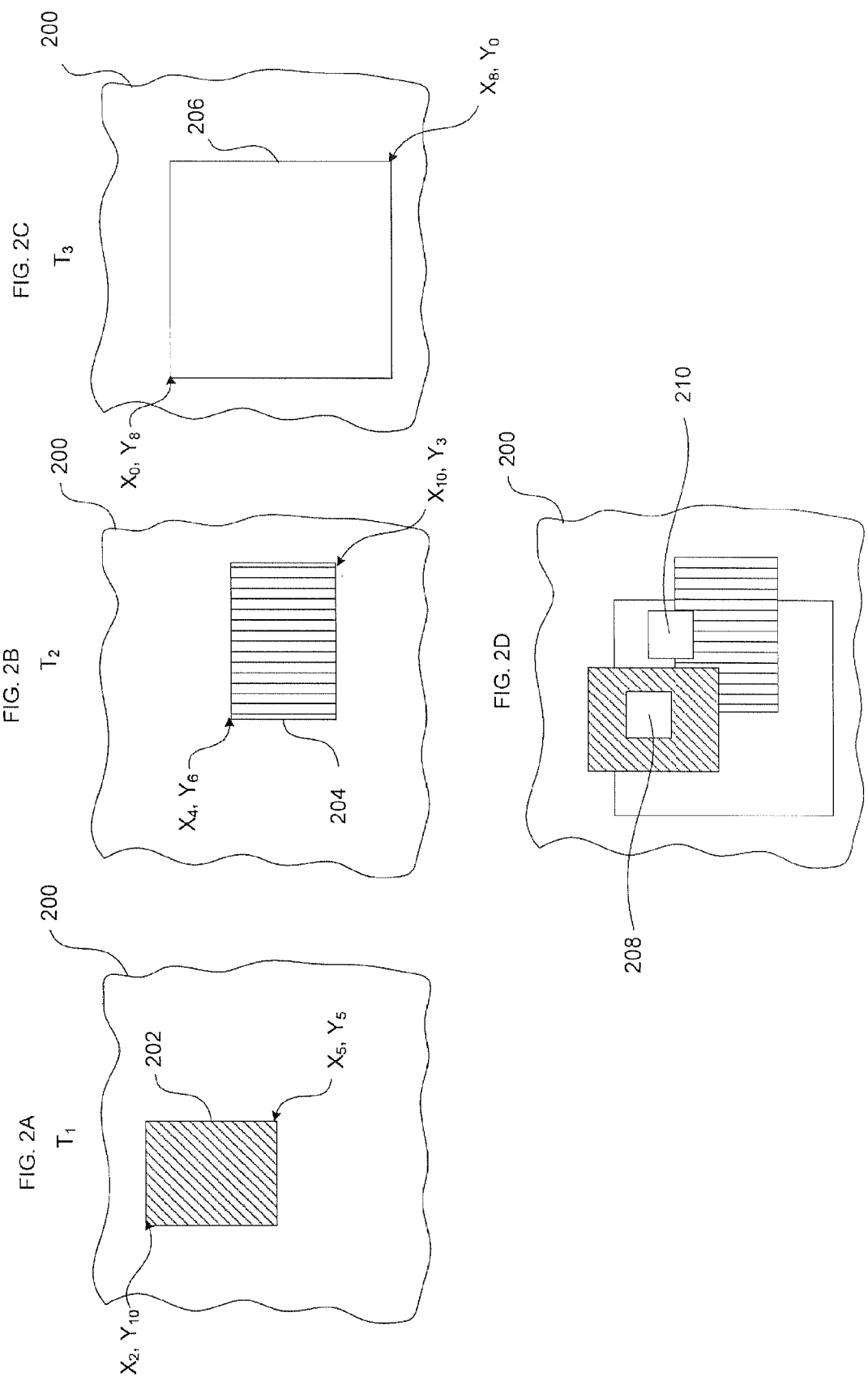

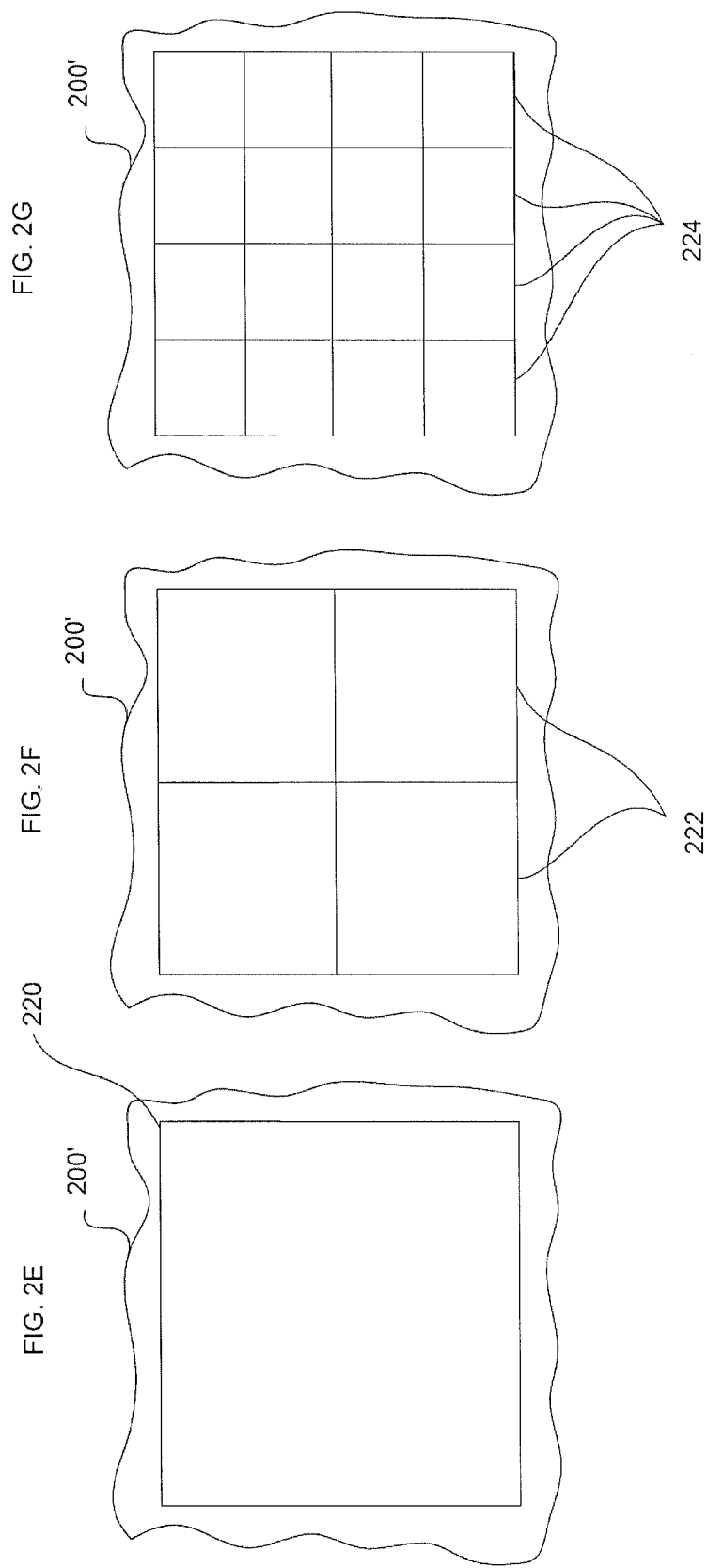

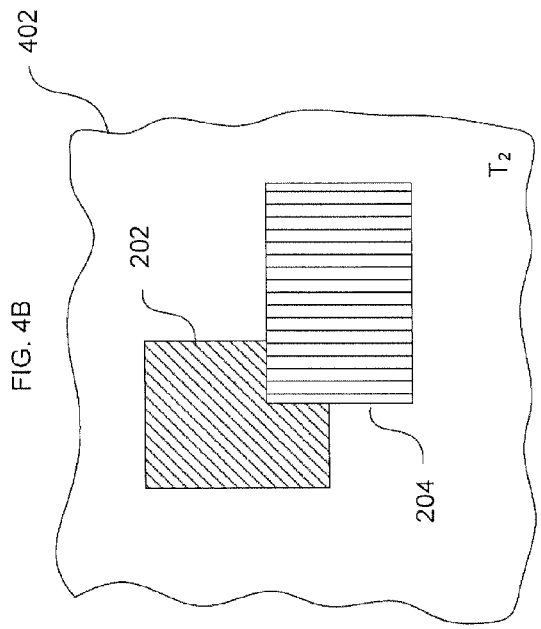
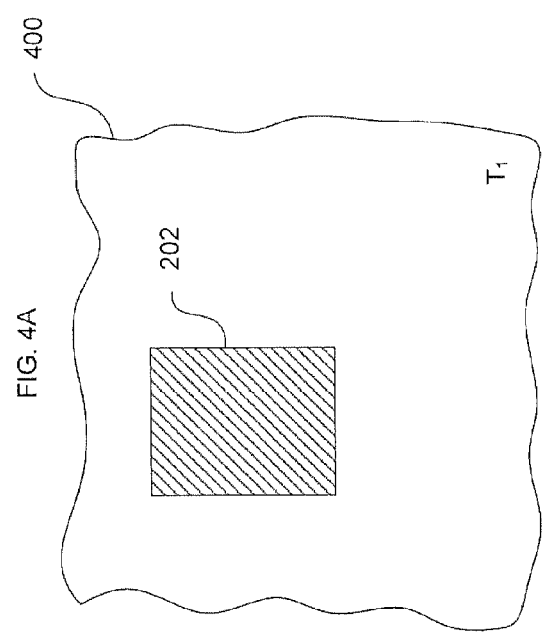
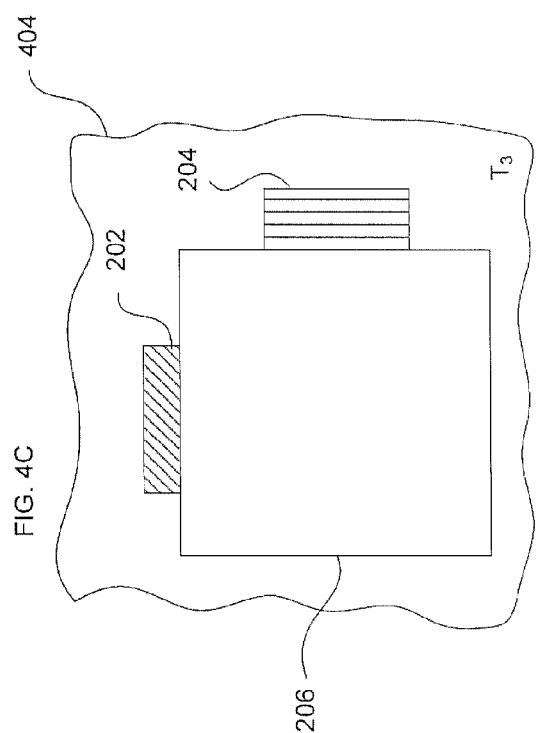

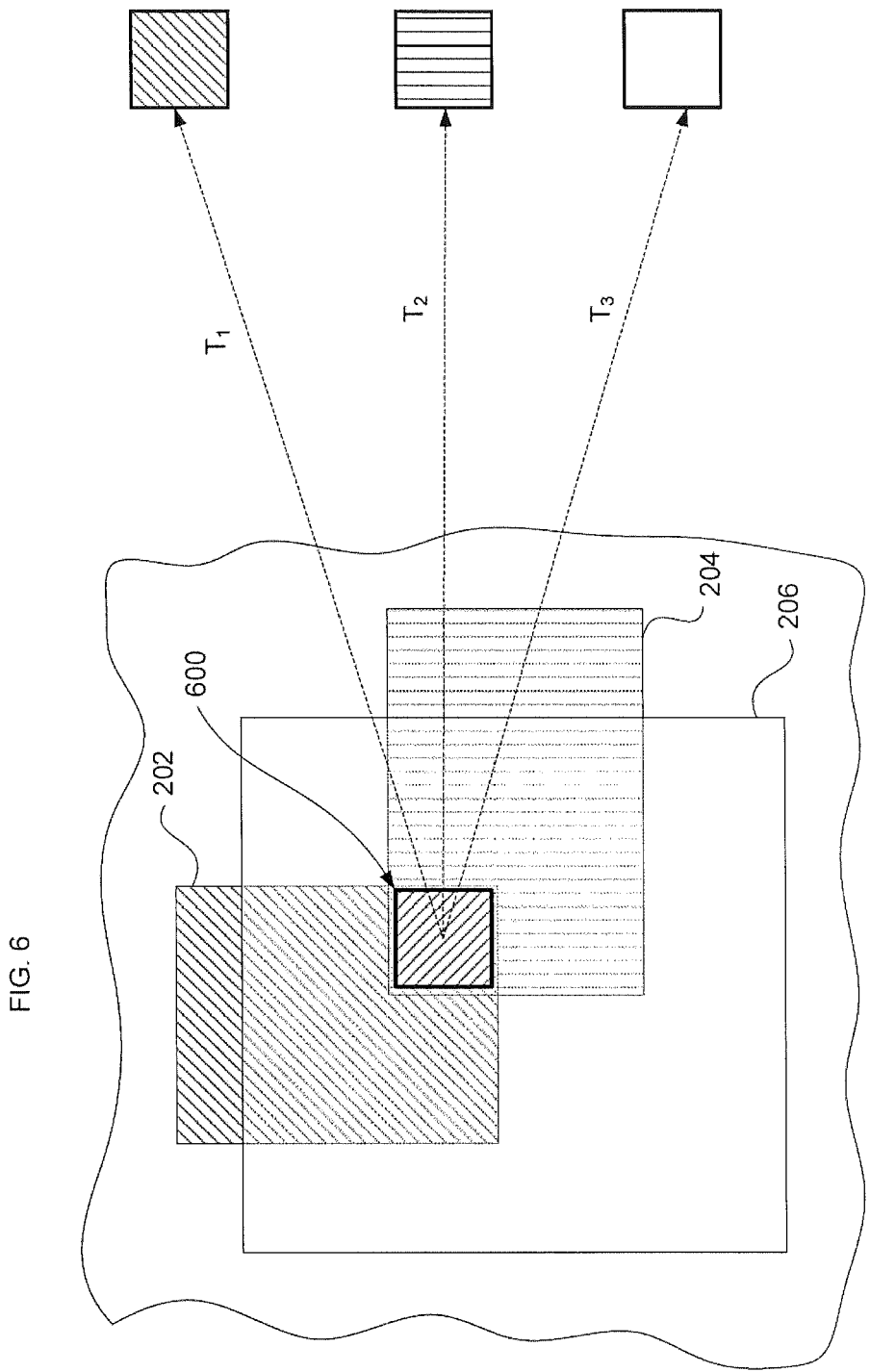

FIG. 7A

| Acquisition Time ($T_N$) | Asset | Level of Detail |
|---|---|---|
| $T_1$ | B | 2 |
| $T_2$ | C | 4 |
| $T_3$ | E | 5 |
| $T_4$ | D | 5 |
| $T_5$ | A | 1 |
| $T_6$ | F | 6 |

FIG. 7B

| Level of Detail (1-6) | Asset | Time-Based Tile(s) |
|---|---|---|
| 1 | A | $T_1 = B$; $T_2 = B+C$; $T_3 = B+C+E$; $T_4 = B+C+E+D$; $T_5 = B+C+E+D+A$; $T_6 = B+C+E+D+A+F$ |
| 2 | B | $T_1 = B$; $T_2 = B+C$; $T_3 = B+C+E$; $T_4 = B+C+E+D$; $T_5 = B+C+E+D+A$; $T_6 = B+C+E+D+A+F$ |
| 3 | -- | $T_2 = C$; $T_3 = C+E$; $T_4 = C+E+D$; $T_6 = C+E+D+F$ |
| 4 | C | $T_2 = C$; $T_3 = C+E$; $T_4 = C+E+D$; $T_6 = C+E+D+F$ |
| 5 | E, D | $T_3 = E$; $T_4 = E+D$; $T_6 = E+D+F$ |
| 6 | F | $T_6 = F$ |

FIG. 7C

| Asset | Location | Level of Detail | Acquisition Time |
|---|---|---|---|
| A | $X_2, Y_{10} - X_5, Y_5$ | 1 | $T_1$ |
| B | $X_4, Y_6 - X_{10}, Y_3$ | 2 | $T_2$ |
| C | $X_0, Y_8 - X_8, Y_0$ | 4 | $T_3$ |
| D | $X_3, Y_3 - X_7, Y_7$ | 5 | $T_4$ |
| E | $X_6, Y_0 - X_9, Y_5$ | 5 | $T_5$ |
| F | $X_5, Y_2 - X_9, Y_9$ | 6 | $T_6$ |

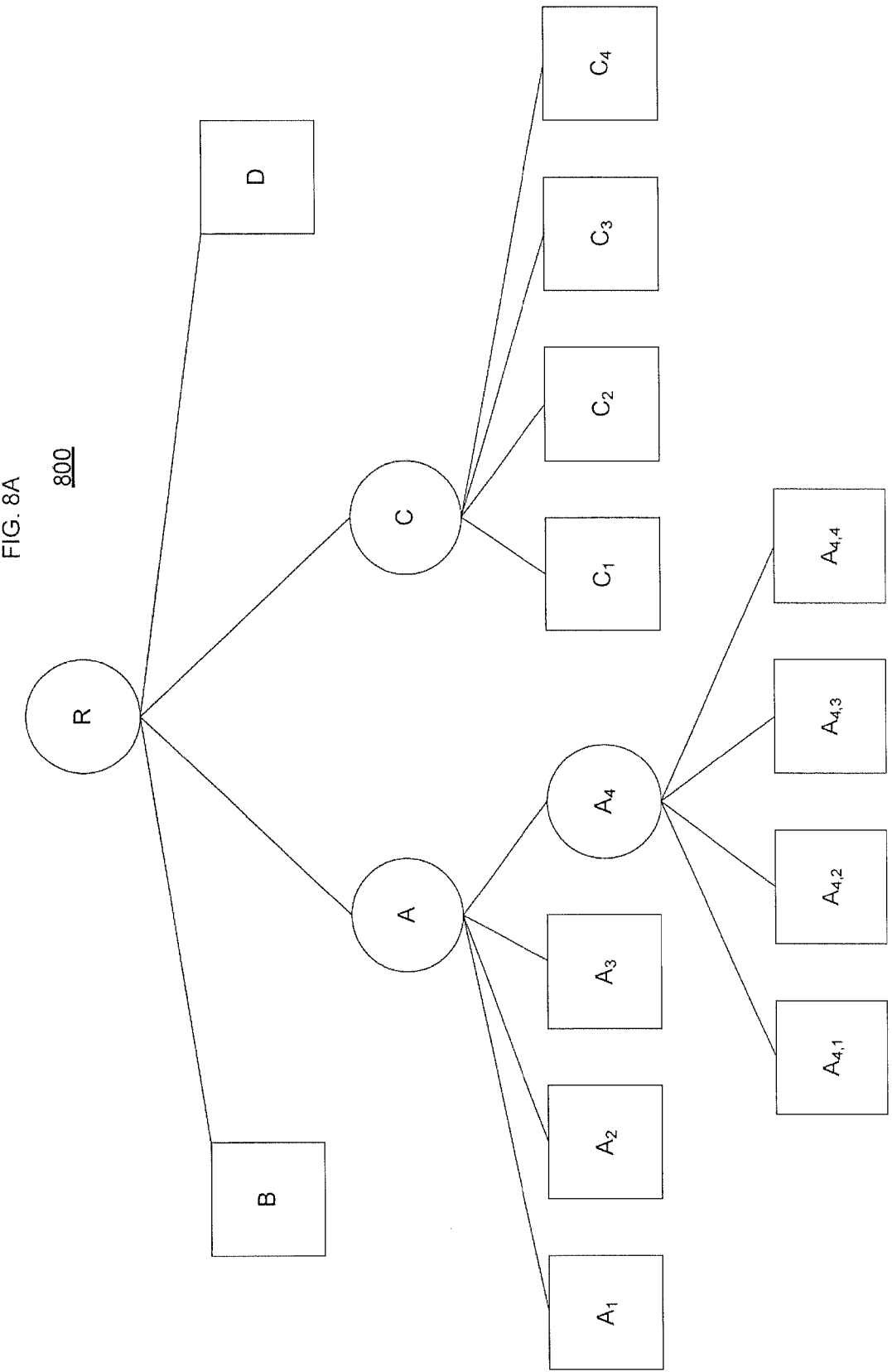

| | B | | D |
| A₂ | A₄,₂ | A₄,₄ | C₂ | C₄ |
| | A₄,₁ | A₄,₃ | | |
| A₁ | A₃ | C₁ | C₃ |

FIG. 9B 902
Quadtree Table

| Quadset Data |
|---|
| Quadset 1 Data |
| Quadset 2 Data |
| Quadset 3 Data |
| ••• |
| Quadset M Data |

Quadset 1
Quadset 2
Quadset 3
Quadset M

FIG. 9A 900
Index Table

| Data Version | Data Location |
|---|---|
| 7 | ...\pathname\filename |
| 7 | ...\pathname\filename |
| 6 | ...\pathname\filename |
| ••• | ••• |
| X | |

Quadnode 1
Quadnode 2
Quadnode 3
Quadnode N

ARCHITECTURES AND METHODS FOR CREATING AND REPRESENTING TIME-DEPENDENT IMAGERY

CROSS-REFERENCE TO RELATED APPLICATIONS

The present application is a continuation of U.S. patent application Ser. No. 13/939,628, filed Jul. 11, 2013, which is a continuation of U.S. application Ser. No. 13/619,183, filed on Sep. 14, 2012 and issued as U.S. Pat. No. 8,520,977, which is a continuation of U.S. application Ser. No. 13/285,250, filed on Oct. 31, 2011 and issued as U.S. Pat. No. 8,295,550, which is a continuation of U.S. application Ser. No. 12/231,290, filed on Aug. 28, 2008 and issued as U.S. Pat. No. 8,077,918 on Dec. 13, 2011, the entire disclosures of which are incorporated herein by reference.

BACKGROUND OF THE INVENTION

1. Field of the Invention

The present invention relates generally to image mapping systems and methods. More particularly, the present invention relates to blending imagery in a geographical mapping environment.

2. Description of Related Art

Imagery taken by satellites, planes and other sources has long been used to provide visual information about the earth. Recently, dramatic improvements in computer processing power and broadband streaming technology have led to the development of interactive systems for navigating imagery (e.g., map imagery). Some interactive map navigation systems provide a user interface ("UI") with navigation controls for dynamically navigating cities, neighborhoods and other terrain in three dimensions. The navigation controls enable users to tilt, pan, rotate, zoom and activate terrain and buildings for different perspectives at a point of interest. An example of an interactive 3D map system for navigating Earth imagery is Google Earth™ developed by Google Inc. (Mountain View, Calif.).

The production imagery used by interactive map navigation systems is typically derived by processing large pieces of geo-located imagery or "assets." Such assets can be taken from a single pass of a satellite, airplane or other airborne platform, or can be stitched together from multiple aerial images. Once the assets are processed, they can be moved to datacenters where it can be distributed to client devices.

Different assets may have different resolutions and/or may be captured at different points in time. Large quantities of new assets are collected on an ongoing basis. Unfortunately, processing such assets can be a complex and time consuming process. Furthermore, image storage and database maintenance may be problematic due to an ever-expanding amount of assets. Aspects of the present invention address these and other problems.

SUMMARY OF THE INVENTION

Architectures and methods that process and distribute time-dependent assets to users are provided herein.

In accordance with one embodiment of the present invention, a method comprises providing an identification of available points in time for which images are available for a geographical location, the identification being provided by a processor of a computer; receiving a request for an image associated with the geographical location for one of the available points in time at the computer; and in response to the request, the computer providing the image associated with the requested geographical location. Portions of the provided image comprise different images of the geographical location captured at different points in time. The different images are selected from a plurality of images comprising images captured before and after the requested point in time. Furthermore, the different images included in the provided image were captured prior to the requested point in time.

In one alternative, the method further comprises deriving the plurality of different images from assets obtained from an imagery source; and identifying the point in time associated with each of the plurality of different images, each point in time corresponding to an acquisition date of a respective asset.

In this case, the method may further comprise generating a blended image for the requested point in time. Here, the blended image includes at least one secondary image from a point in time earlier than the requested point in time and a primary image from the requested point in time. In this case the primary image overlies the secondary image.

In another case, generating the blended image for the requested point in time includes generating multiple blended images each having a different level of detail. In this case, the request for an image associated with the geographical location may further include a request for a minimum level of detail and wherein the provided image is one of the blended images having the minimum level of detail.

In accordance with another embodiment of the present invention, a method of processing geographical imagery comprises obtaining imagery from an imagery source; identifying an acquisition date for at least some of the imagery obtained from the imagery source; blending overlapping pieces of imagery with a processor of a computer based on respective acquisition dates to form one or more image tiles associated with each acquisition date; storing the one or more tiles in memory associated with the computer; and providing at least one of the image tiles having a selected acquisition date from the memory to a user upon request for an image associated with a geographical location for the selected acquisition date.

In one alternative, blending the overlapping pieces of imagery based on the respective acquisition dates forms multiple tiles for a given acquisition date. Here, the overlapping pieces of imagery are layered chronologically by acquisition date. In one example, the piece of imagery with the most recent acquisition date overlies the other pieces of imagery with earlier acquisition dates. In another example, at least some of the multiple image tiles incorporate the same overlapping pieces of imagery at different levels of detail.

In accordance with a further embodiment of the present invention, a processing system for processing geographical imagery comprises at least one processor and memory for storing data. The memory is electrically coupled to the at least one processor. The at least one processor is operable to obtain imagery from an imagery source, to identify an acquisition date for at least some of the imagery obtained from the imagery source, to blend overlapping pieces of imagery based on respective acquisition dates to form one or more image tiles associated with each acquisition date, to store the one or more image tiles in the memory, and to provide at least one image tile having a selected acquisition date from the memory to a user upon request for an image associated with a geographical location for the selected acquisition date.

In an example, the at least one processor is operable to blend the overlapping pieces of imagery based on the respective acquisition dates to form multiple image tiles for each acquisition date. Here, the overlapping pieces of imagery are layered chronologically by acquisition date. In one alternative, the piece of imagery with the most recent acquisition date overlies the other pieces of imagery with earlier acquisition dates. In another alternative, at least some of the multiple image tiles incorporate the same overlapping pieces of imagery at different levels of detail.

In accordance with yet another embodiment of the present invention, a computer-readable medium having instructions stored thereon is provided. The instructions, when executed by a processor, cause the processor to perform the operations of obtaining imagery from an imagery source; identifying an acquisition date for at least some of the imagery obtained from the imagery source; blending overlapping pieces of imagery based on respective acquisition dates to form one or more image tiles associated with each acquisition date; storing the one or more tiles in memory; and providing at least one image tile having a selected acquisition date from the memory to a user upon request for an image associated with a geographical location for the selected acquisition date.

In accordance with another embodiment of the present invention, a method of processing imagery comprises blending a plurality of tiles representative of a geographical location using a processor, at least some of the tiles being time-based tiles associated with imagery of the geographical location from different acquisition dates; preparing a tiles table for organizing the plurality of tiles, the tiles table being indexed by location and level of detail for each of the plurality of tiles; creating fingerprints having tile creation information for each of the plurality of tiles; the processor generating a plurality of packfiles, each packfile being associated with at least one of the plurality of tiles; and distributing the plurality of packfiles to at least one datacenter; wherein the tiles table further indexes the time-based tiles by acquisition date.

In one example, blending the time-based tiles includes blending overlapping pieces of imagery based on respective acquisition dates. In another example, a given packfile contains at least one of a given tile, an indication that the given tile is shared with a database, or a deletion marker indicating that a tile entry is to be deleted.

In an alternative, the method further comprises updating a respective one of the fingerprints after tile information associated with the respective fingerprint has been incorporated into a packfile. In this case, the method may also comprise updating the tiles table based on the updated fingerprint.

In yet another alternative, the method further comprises indexing the distributed packfiles; updating an image data table based upon the distributed packfiles; and updating a quadtree packet table based upon the indexed packfiles; wherein each distributed packfile having time-based information therein is further indexed based upon the time-based information. In one example, the method further comprises storing the image data table and the quadtree packet table in a database of an image server.

In accordance with another embodiment of the present invention, a system for managing imagery is provided. The system includes means for indexing time-based packfiles and non-time-based packfiles. Each packfile contains at least one of an image tile, an indication that the at least one image tile is shared with a database, or a deletion marker indicating that an image tile entry in the database is to be deleted. The system also includes means for updating at least one image data table based upon the time-based and non-time-based packfiles. The at least one image data table includes image data for generated image tiles. The system also includes means for updating at least one quadtree packet table based upon the indexed packfiles and means for distributing quadtree packets of the quadtree packet table and image data of the at least one image data table to a client device upon request.

In one example, the means for indexing the packfiles indexes the time-based packfiles in a time-based index table and indexes the non-time-based packfiles in a non-time-based index table. Each index table includes a version indicator and a location indicator while the time-based-index table further includes a date indicator.

In another example, the at least one quadtree packet table includes a first quadtree packet table for managing time-based quadtree packets and a second quadtree packet table for managing non-time-based quadtree packets.

In an alternative, the system further comprises means for creating fingerprints. Each of the fingerprints has tile creation information for a respective one of the image tiles.

In another alternative, the system further comprising means for processing selected image tiles based upon the fingerprints. In this case, the means for processing may be operable to blend an existing image tile with a new image tile having time information associated therewith. Here, whether blending is performed is based on a comparison of the fingerprint of the existing image tile with the fingerprint of the new time-based image tile.

In accordance with yet another embodiment of the present invention, an image processing method comprises a processor requesting quadtree packets for a geographical location, the quadtree packets containing tile information for the geographical location, at least some of the quadtree packets including date information for respective tiles associated therewith; the processor requesting one or more tiles having a specified date for the geographical location; and the processor presenting at least one of the requested tiles on a display, wherein portions of the at least one of the requested tiles comprise different images of the geographical location captured at different points in time, the different images being selected from a plurality of images comprising images captured before and after the specified date, and wherein the different images included in the presented tile were captured prior to the specified date.

In one alternative, the portions are blended chronologically. In another alternative, quadtree packets further include level of detail information for the respective tiles. Here, requesting the one or more tiles further includes identifying a specific level of detail to be presented on the display.

BRIEF DESCRIPTION OF THE DRAWINGS

FIG. 1 is a flow diagram in accordance with aspects of the present invention.

FIGS. 2A-G illustrate examples of assets and tiles for a region of interest.

FIGS. 4A-C illustrate asset handling in accordance with aspects of the present invention.

FIG. 6 illustrates tile generation in accordance with aspects of the present invention.

FIGS. 7A-C illustrate assets and image tile generation and indexing in accordance with aspects of the present invention.

FIGS. 8A-B illustrate a quadtree hierarchical spatial data structure and tile generation in accordance with aspects of the present invention.

FIGS. 9A-B illustrate an index table and a quadtree table for use with aspects of the present invention.

DETAILED DESCRIPTION

Figure 3A:
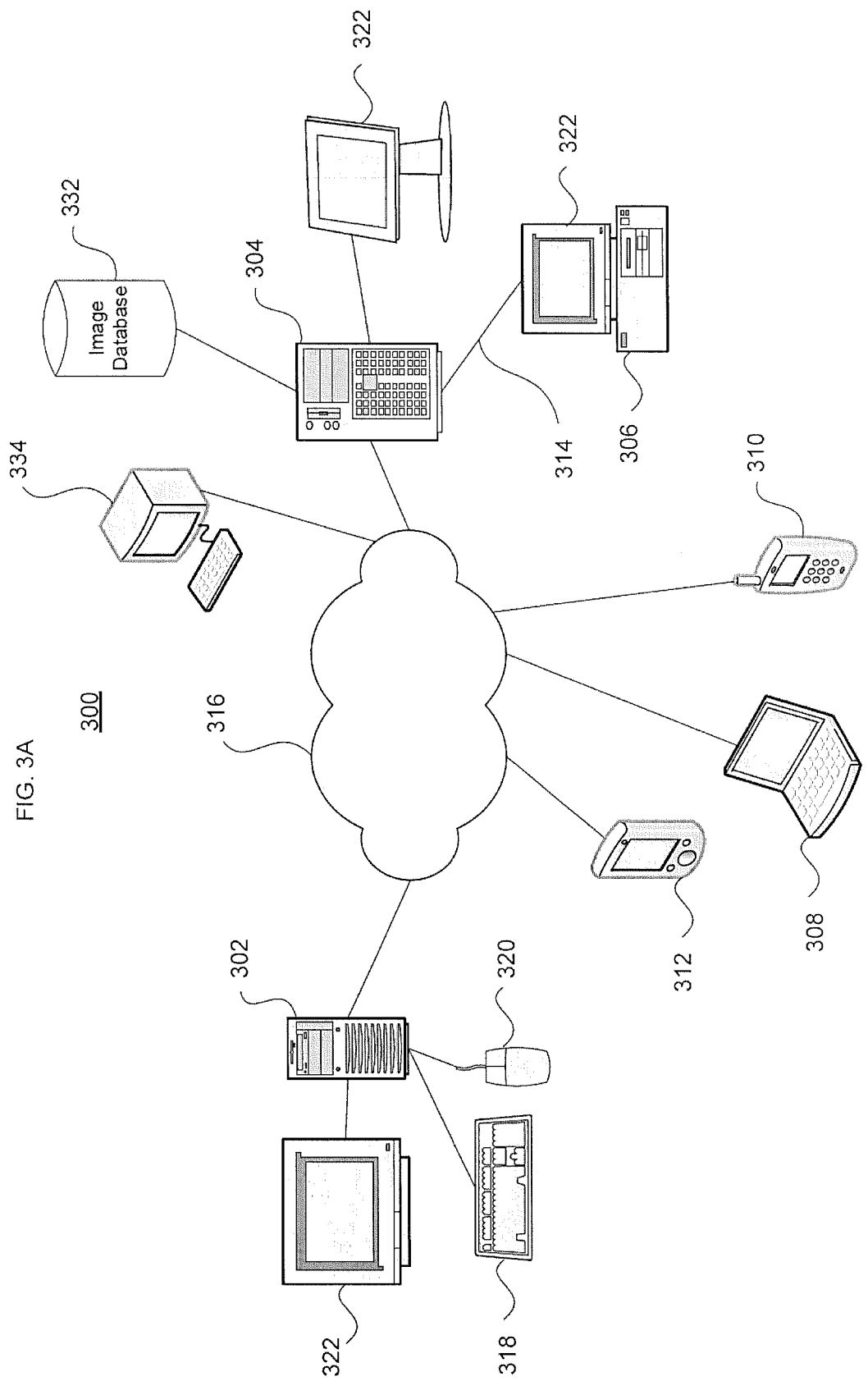
FIGS. 3A-B illustrate a computer system for use in accordance with embodiments of the present invention.

The aspects, features and advantages of the present invention will be appreciated when considered with reference to the following description of preferred embodiments and accompanying figures. The same reference numbers in different drawings may identify the same or similar elements. Furthermore, the following description does not limit the present invention; rather, the scope of the invention is defined by the appended claims and equivalents.

In accordance with aspects of the present invention, assets having different resolution and/or times of capture may be processed, for instance by "blending" parts of multiple assets together in order to provide images of a particular location or region at particular points in time. FIG. 1 illustrates an exemplary process 100 which produces one or more blended images for a given date, for instance in response to a user request.

The process 100 includes block 102, where the assets (e.g., aerial imagery) are obtained. By way of example, aerial reconnaissance dates back to World War I, if not earlier. Governments have used satellites since the 1960s to take images of the Earth. More recently, commercial satellites have also generated images of the Earth. Assets from different sources may be collected and stored in an image database. As such assets may date from different times, the acquisition date for each asset is identified as shown in block 104.

Various assets can be received from one or more sources and can have a variety of orientations. Such assets can be re-projected into a suitable coordinate system for the map system (e.g., a geospatial coordinate system) and stored in one or more data structures (e.g., database table). The re-projected assets may then be divided into tiles which are processed independently, for example in a parallel processing infrastructure. The tiles may be stored so tiles that include imagery for geographic locations that are close to each other have a high probability of being stored on the same machine or in the same machine cluster to reduce the overhead associated with accessing information located on multiple machines. In this case, the tiles can be sized to fall within the storage constraints of the machines or a cluster of machines. The assets can be divided into any desired shape. A tile shape, however, typically requires less computational and/or representational overhead during processing. A discussion of such tile manipulation, including coverage masks, feathering and "minification" (e.g., resolution upsampling or downsampling) is provided in U.S. patent application Ser. No. 11/437,553 ("the '553 application"), entitled "Large-Scale Image Processing Using Mass Parallelization Techniques," filed May 19, 2006, the entire disclosure of which is hereby expressly incorporated by reference herein.

As shown in block 106, one or more "tiles" may be generated from the assets. Tiles represent a section of imagery at a particular resolution and location. For instance, a given asset may image a certain region of the Earth. FIGS. 2A-2C illustrate an example of three different overlapping assets taken at different times for a particular region 200. In this example, FIG. 2A shows a first asset 202 having a pair of bounding coordinates $X_2,Y_{10}$ and $X_5,Y_5$; FIG. 2B shows a second asset 204 having a pair of bounding coordinates $X_4,Y_6$ and $X_{10},Y_3$; and FIG. 2C shows a third asset 206 having a pair of bounding coordinates $X_0,Y_8$ and $X_8,Y_0$. The coordinates may represent latitude and longitude, Cartesian coordinates or some other geographic coordinate system. In this example, asset 202 is from a time $T_1$, asset 204 is from a time $T_2$, and asset 206 is from a time $T_3$. A user may request a tile which falls in a region covered by multiple assets. By way of example, a first tile 208 may fall within both assets 202 and 206, while a second tile 210 may overlap assets 204 and 206, as shown in FIG. 2D.

Tiles covering the same region need not be the same size or the same resolution. FIGS. 2E-F illustrate a region 200' which may be covered by different sets of tiles. As shown in FIG. 2E, the region 200' may be covered by a single tile 220 having a first resolution. As shown in FIG. 2F, the region 200' may be covered by a quartet of tiles 222. Each tile 222 may have a second resolution such as a higher resolution than the first resolution. And as shown in FIG. 2G, the region 200' may be covered by a set of tiles 224, for instance 16 tiles each having a third resolution. The third resolution may be higher than the second resolution. Thus, in this example, tile size may decrease as resolution or level of detail ("LOD") increases. Alternatively, each tile 220, 222 and 224 may have the same resolution, e.g., 256×256. Thus, the four tiles 222 may have a combined 512×512 pixels, and the sixteen tiles 224 may have a combined 1024×1024 pixels. Interpolation may be used to generate the tiles 222 from tile 220. Similarly, interpolation may be used to generate the tiles 224 from tile 220 and/or tiles 222. This is known as magnification. Conversely, finer resolution imagery may be resampled to coarser resolution by known imaging techniques. While only three resolutions are identified in this example, it should be understood that any number of resolution levels may be provided.

Returning to FIG. 1, at block 108 the LOD for each asset may be used to generate one or more images for each tile. For instance, asset 202 may have a resolution of 20 cm, asset 204 may have a resolution of 50 cm, and asset 206 may have a resolution of 2 m. In a typical system, different parameters including resolution as well as image quality and image coverage may be used to determine how a given tile is generated.

However, as more and more assets are collected, older assets may be covered up by newer imagery. For instance, asset 206 may completely obscure asset 202 and may partially obscure asset 204. It may be desirable to make the older imagery available so that users can see how the surface of the Earth has changed over time. Thus, in accordance with one aspect of the invention, overlapping assets may be blended together based on acquisition date, as shown in block 110. The blending results in tiles such as tiles 208 and 210 of FIG. 2D.

And as shown in block 112 of FIG. 1, a series of images may be produced for each tile, for instance generating one tile image for each unique date when image assets intersecting the tile were originally acquired. Such tile images may be stored in an image database and/or associated with a data structure, as will be discussed in more detail below. Once the tile images have been created, they may be provided to a client device, for instance in response to a user request, such as shown at block 114.

Different architectures may be employed to achieve such results. For instance, FIG. 3A presents a schematic diagram of a computer system depicting various computing devices that can be used alone or in a networked configuration in accordance with aspects of the present invention. For example, this figure illustrates a computer network 300 having a plurality of computers 302, 304, 306 and 308 as well as other types of devices such as portable electronic devices such as a mobile phone 310 and a PDA 312. The computer processing systems may be interconnected via a local or direct connection 314 and/or may be coupled via a communications network 316 such as a LAN, WAN, the Internet, etc. and which may be wired or wireless.

Figure 3B:
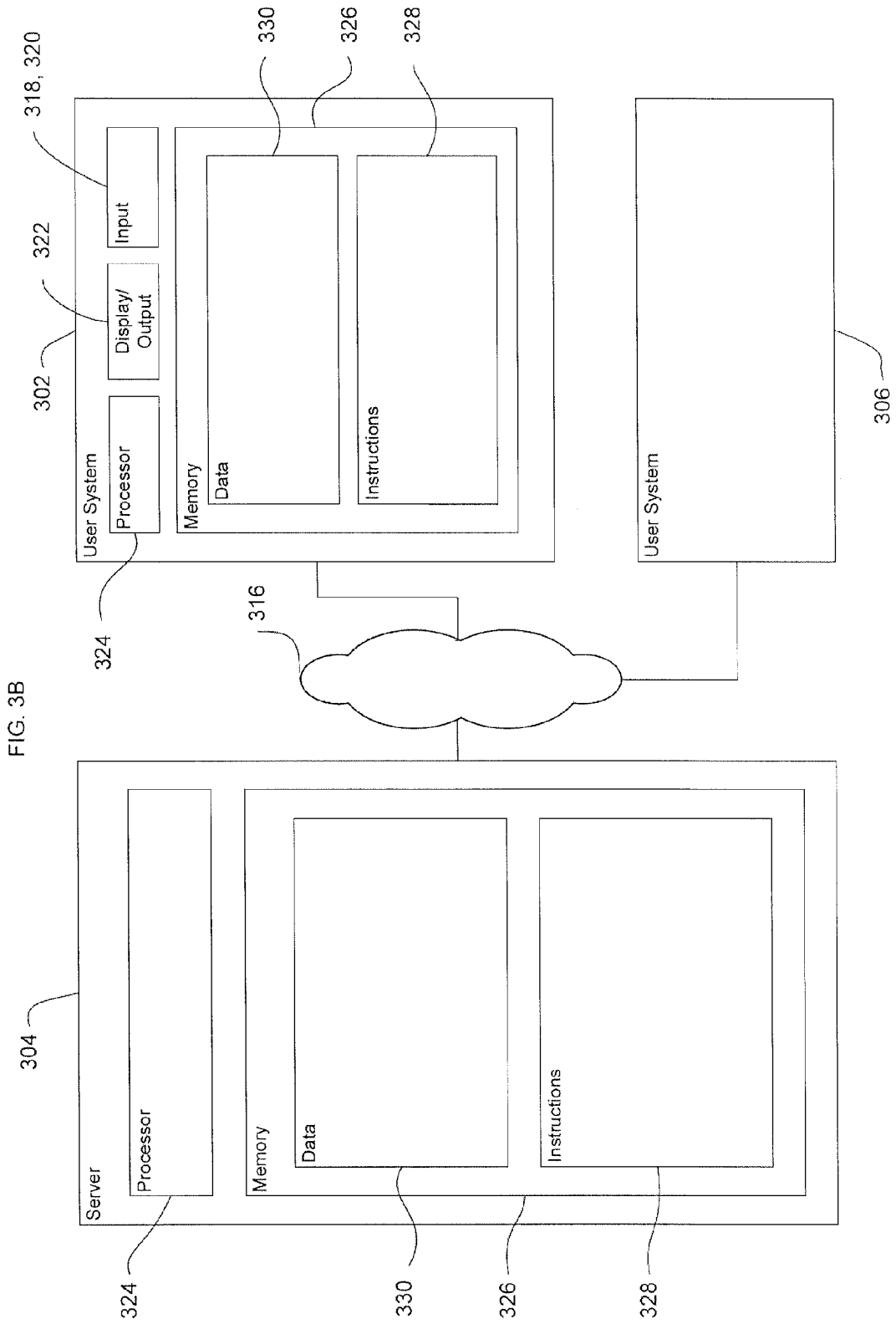

Each computer processing system can include, for example, one or more computing devices having user inputs such as a keyboard 318 and mouse 320 and/or various other types of input devices such as pen-inputs, joysticks, buttons, touch screens, etc., as well as a display 322, which could include, for instance, a CRT, LCD, plasma screen monitor, TV, projector, etc. Each computer 302, 304, 206 and 308 may be a personal computer, server, etc. By way of example only, computers 302 and 306 may be personal computers while computer 304 may be a server and computer 308 may be a laptop. As shown in FIG. 3B each computer such as computers 302 and 304 contain a processor 324, memory 326 and other components typically present in a computer.

Memory 326 stores information accessible by processor 324, including instructions 328 that may be executed by the processor 324 and data 330 that may be retrieved, manipulated or stored by the processor. The memory may be of any type capable of storing information accessible by the processor, such as a hard-drive, ROM, RAM, CD-ROM, flash memories, write-capable or read-only memories. The processor 324 may comprise any number of well-known processors, such as processors from Intel Corporation. Alternatively, the processor may be a dedicated controller for executing operations, such as an ASIC.

The instructions 328 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. The functions, methods and routines of instructions in accordance with the present invention are explained in more detail below.

Data 330 may be retrieved, stored or modified by processor 324 in accordance with the instructions 328. The data may be stored as a collection of data. For instance, although the invention is not limited by any particular data structure, the data may be stored in computer registers, in a relational database as a table having a plurality of different fields and records, XML documents, or flat files. As will be explained in more detail below, certain image-related data may be stored in flat files such as keyhole flat files ("KFF").

The data may also be formatted in any computer readable format such as, but not limited to, binary values, ASCII or EBCDIC (Extended Binary-Coded Decimal Interchange Code). Similarly, the data may include images stored in a variety of formats such as vector-based images or bitmap images using lossless (e.g., BMP) or lossy (e.g., JPEG) encoding. Moreover, the data may include any information sufficient to identify the relevant information, such as descriptive text, proprietary codes, pointers, references to data stored in other memories (including other network locations) or information which is used by a function to calculate the relevant data.

Although the processor 324 and memory 326 are functionally illustrated in FIG. 3B as being within the same block, it will be understood that the processor and memory may actually comprise multiple processors and memories that may or may not be stored within the same physical housing or location. For example, some or all of the instructions and data may be stored on a removable CD-ROM and others within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 326 such as hard drives or the like.

In one aspect, server 304 communicates with one or more client computers 302, 306 and/or 308, as well as devices such as mobile phone 310 and PDA 312. Each client computer or other client device may be configured similarly to the server 304, with a processor, memory and instructions, as well as one or more user input devices 318, 320 and a user output device, such as display 322. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

The server 304 and client computers and other devices are capable of direct and indirect communication with other computers, such as over network 316. Although only a few computing devices are depicted in FIGS. 3A and 3B, it should be appreciated that a typical system can include a large number of connected servers and clients, with each different computer being at a different node of the network. The network 316, and intervening nodes, may comprise various configurations and protocols including the Internet, intranets, virtual private networks, wide area networks, local networks, private networks using communication protocols proprietary to one or more companies, Ethernet, WiFi, Bluetooth and HTTP.

Communication across the network, including any intervening nodes, may be facilitated by any device capable of transmitting data to and from other computers, such as modems (e.g., dial-up or cable), network interfaces and wireless interfaces. Server 304 may be a web server. Although certain advantages are obtained when information is transmitted or received as noted above, other aspects of the invention are not limited to any particular manner of transmission of information. For example, in some aspects, the information may be sent via a medium such as a disk, tape, CD-ROM, or directly between two computer systems via a dial-up modem. In other aspects, the information may be transmitted in a non-electronic format and manually entered into the system.

Moreover, computers and client devices in accordance with the systems and methods described herein may comprise any device capable of processing instructions and transmitting data to and from humans and other computers, including network computers lacking local storage capability, PDA's with modems such as PDA 312 and Internet-capable wireless phones such as mobile phone 310.

As shown in FIG. 3A, the network 300 may also include an image database 332 and/or a map information provider 334. The image database 332 and the map information provider 334 may be directly or indirectly coupled to server 304. In an alternative, the image database 332 and the map information provider 334 may be part of or otherwise logically associated with the server 304. The image database 332 may store data 330 in one or more KFFs. The map information provider 334 may obtain assets and other information, including satellite data, aerial photographs, digital maps, elevation data, GPS coordinates, etc. from one or more sources (not shown). Examples of an image database and a map information provider are provided in co-pending and jointly owned U.S. patent application Ser. No. 11/762,049 ("the '049 application"), entitled "Markup Language for Interactive Geographic Information System," filed Jun. 12, 2007 and published as U.S. Patent Publication No. 2008/0016472 on Jan. 17, 2008, the entire disclosure of which is hereby expressly incorporated by reference herein. Furthermore, each client device (e.g., computers 302, 306 and 308, as well as mobile phone 310 and PDA 312), may include or run application software such as a geospatial browser, which may include a mapping module, as disclosed in the '049 application.

As discussed above with regard to FIGS. 2A-2D, different overlapping assets may be imaged at different times for a particular region of interest. Thus, when preparing a given tile encompassed by multiple assets, different options are available. For instance, one may "rank" the assets based on resolution. Here, the highest resolution assets may be placed on a top or frontmost layer, while the next higher resolution asset may be placed in a next lower layer, and so on in order of decreasing resolution. The layers may be blended in this manner to provide for a "best" resolution based upon the available assets.

The example set forth above in FIG. 2D presents such a scenario. Here, tiles 208 and 210 are formed using the best available asset resolution. Thus, as shown in the figure, the tile 208 may be comprised solely of a portion of the asset 202, while the tile 210 may comprise a portion of the asset 204 (shown as the lower half of the tile) and a portion of the asset 206 (shown as the upper half of the tile.

However, tiles may be formed based on criteria other than resolution. A particularly suitable criterion is by date of acquisition of the asset(s). For instance, in many situations a user may choose to view a region of interest as it looked at one or more points in time. Evaluating how the landscape evolves is often relevant to urban planning (e.g., how has a city expanded over time), ecology (e.g., has the size of wetlands shrunk due to construction) and home buyers (e.g., how many homes in the neighborhood have been renovated in recent years), to name a few. Thus, according to one aspect of the present invention, assets may be blended to produce multiple outputs (e.g., tiles) for a given location, where each output represents the appearance of that location at a particular time.

In the example in FIGS. 2A-C, the asset 202 is from time $T_1$, the asset 204 is from time $T_2$, and the asset 206 is from time $T_3$. Suppose that time $T_1$ is the earliest and time $T_3$ is the most recent. In this case, one could produce at least three blended views. Examples of such views are presented in FIGS. 4A-C. As shown in FIG. 4A, the view 400 at time $T_1$ includes only asset 202. The view 402 at time $T_2$, shown in FIG. 4B, includes both asset 202 and asset 204. Here, a combination of the two assets has asset 204 overlying asset 202, even though asset 202 may include higher resolution imagery. And as shown in FIG. 4C, the view 404 incorporates all three assets 202, 204 and 206, with the most recent asset 206 overlying both asset 204 and asset 202.

Figure 5B:
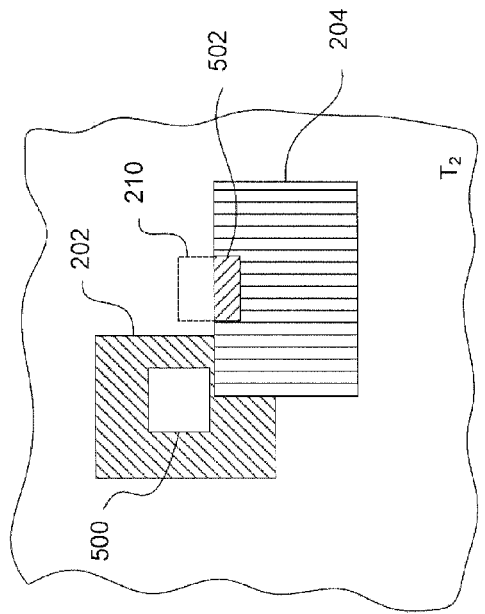
FIGS. 5A-C illustrate tile generation in accordance with aspects of the present invention.
Figure 5A:
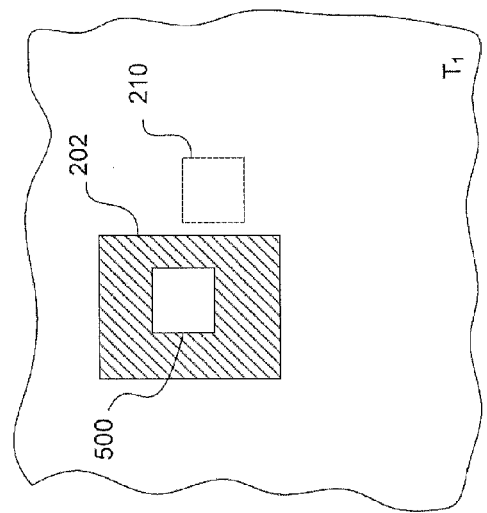
Figure 5C:
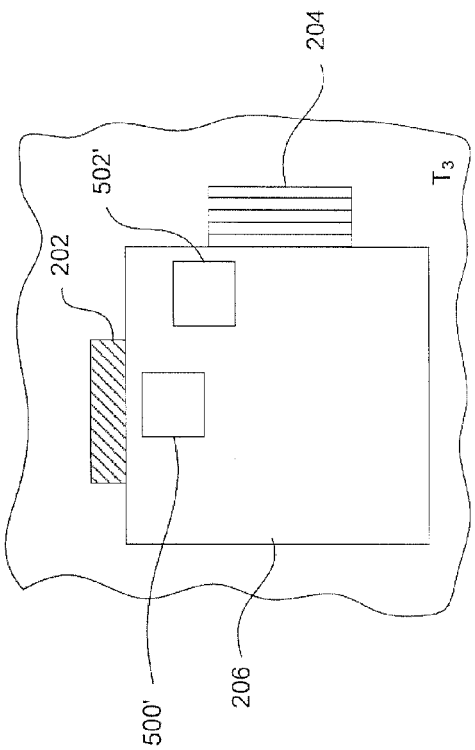

If a user requests a view covered by a tile comparable to tile 208 of FIG. 2D, the resultant tile provided will depend on the time of interest. For instance, as shown in FIG. 5A, at time $T_1$ tile 500 will be provided, where this tile is equivalent to tile 208 of FIG. 2D as both are derived from asset 202. As shown in FIG. 5B, at time $T_2$ the tile 500 is also provided, as asset 204 does not encompass this region. In contrast, as shown in FIG. 5C, at time $T_3$ tile 500' is provided, where this tile comprises imagery from asset 206 but preferably not from asset 202.

Similarly, if a user requests a view covered by a tile comparable to tile 210 of FIG. 2D, the resultant tile provided will depend on the time of interest. Here, tile 210 is illustrated in broken lines for reference. In this case, at time $T_1$ (see FIG. 5A) no tile will be provided because asset 202 does not encompass the region of interest. As shown in FIG. 5B, at time $T_2$ tile 502 is provided. In this example, only a portion of tile 210, namely tile 502, is available due to the coverage of asset 204. In this case, the display may not provide an image for the unavailable portion of tile 210, may indicate to the user that no data is available for that portion of the region of interest, or may provide a default image that may or may not have a date associated with it. In contrast, as shown in FIG. 5C, at time $T_3$ tile 502' is provided. This tile comprises imagery from asset 206 but preferably not from asset 204.

FIG. 6 illustrates another case involving assets 202, 204 and 206. As with the previous examples, asset 202 is the oldest asset, asset 204 is the next oldest asset, and asset 206 is the most recent asset. For ease of illustration, the three assets are presented with asset 204 overlies asset 202 and with asset 204 being partly transparent to show the earlier asset. Similarly, asset 206 overlies assets 202 and 204, and is partly transparent to show both earlier assets.

In the present case, a new region of interest illustrated 600 is shown. Here, region of interest 600 is encompassed by all three assets 202, 204 and 206. Thus, as shown by the dashed arrow, at time $T_1$ a first tile would be formed by the overlapping portion of asset 202. As shown by the dashed arrow, at time $T_2$ a second tile would be formed by the overlapping portion of asset 204. And as shown by the dashed arrow, at time $T_3$ a third tile would be formed by the overlapping portion of asset 206.

In an alternative, it is possible to use imagery from an underlying asset to fill in any gaps or address any defects in the overlying asset of the desired point in time. However, this is preferably done only along the edges of the overlying asset. This is because effects of spatial and/or color misregistration between assets can be magnified, resulting in a poor quality image or tile. Feathering the edges of adjacent asset imagery makes the edges less prominent and distracting.

In accordance with an aspect of the present invention, blending of adjacent and/or overlapping tiles is done using asset acquisition date as the primary criterion blending criterion. FIG. 7A presents an example where six assets (A-F) are obtained at six different times ($T_1, \ldots, T_6$). Each asset is associated with a level of detail, LOD, ranging between 1 (e.g., lowest resolution) and 6 (e.g., highest resolution). In the present case, none of the assets A-F completely covers the tile of interest.

FIG. 7B illustrates how multiple tile images are generated for the tile of interest when multiple assets of different acquisition dates are available. Thus, as shown in the rightmost column in this figure, six different tile images may be generated. As presented in the figure, the symbol "+" means that the asset to the right of the + overlays the asset to the left of the + when blended. For instance, while at time $T_1$ only asset B is used to generate a given tile image, at time $T_2$ assets B and C are blended to generate another tile image. In this case, as asset B was acquired at time $T_1$ and asset C was acquired at time $T_2$, asset C overlays asset B in the blended tile image. Similarly, for time $T_3$, the three assets B, C and E are used, with asset E overlying C and C overlying B. Additional tile images for times $T_4$, $T_5$ and $T_6$ are generated similarly.

A user who is interested in viewing this particular tile of interest has the option to view the tile at six different points in time. By way of example, the user interface of a client device (e.g., computer 302, 306 or 308, mobile phone 310 or PDA 312 of FIG. 3A) may provide the user with a slider bar, radio buttons or other actuator to select a particular point in time. Thus, if the user selects time $T_1$, then the tile image based solely on asset B is shown. If the user selects time $T_4$, then the tile image based on the combination of assets B, C, E and D (blended in the manner shown in the first row) is provided. And if the user selects time $T_6$, then the tile image based on the combination of assets B, C, E, D, A and F (blended in the manner shown in the first row) is provided.

If asset acquisition time was the only criterion, then the first row of FIG. 7B would provide all of the necessary tile images for the tile of interest. However, in accordance with another aspect of the present invention, further tile images may be generated based on LOD and/or other criteria. In the present figure, additional tile images are generated in view of LOD. As shown in the second row (LOD=2), fewer tile images may be generated due to the omission of asset A, which has a LOD of 1. The tiles generated at LOD 2 may be of different size and/or resolution than the tiles generated at LOD 1. For instance, while the tile image(s) for time $T_4$ having an LOD of 2 may be generated using the same assets (B+C+E+D) as the tile image(s) for time $T_4$ having an LOD of 1, more tiles (e.g., sub-tiles) of higher resolution may be employed.

In the example of FIG. 7B, no new tile image need be generated in this case for time $T_5$, as asset A is the only asset for that point in time. Therefore, should a user request a tile of interest at time $T_5$ having a minimum resolution of at least 2, the tile image generated for time $T_4$ or another point in time may be displayed, or the client device may magnify the data. Furthermore, for time $T_6$, in one example only assets B, C, E, D and F are employed at this resolution level. In another example, a blend of higher resolution images may involve a coarser resolution asset such as asset A. Thus, a tile of interest for time $T_6$ may include data magnified from the original resolution of asset A. In one variation, only coarser levels from older assets will be used. Different combinations of assets may be generated for different resolution levels as illustrated in FIG. 7B.

In another variation, the oldest or earliest available asset may be designated to fill in empty or otherwise deficient spots in tiles. This earliest or "baseline" asset may be used as a background layer encompassing the entire tile. This base asset (e.g., asset 0 from time $T_0$) may be magnified (wherein a magnified asset is represented by $M_X$) as needed in a given blend. In the following example, it is assumed that magnifying by one or two levels is sufficient to make an asset completely cover a tile. Thus, a modified version of the table in FIG. 7B may be as follows:

| LOD | Time-Based Tile(s) |
|---|---|
| 1 | $T_1 = M_0 + B$; $T_2 = M_0 + B + C$; $T_3 = M_0 + B + C + E$; $T_4 = M_0 + B + C + E + D$; $T_5 = M_0 + B + C + E + D + A$; $T_6 = M_A + B + C + E + D + F$ |
| 2 | $T_1 = M_0 + B$; $T_2 = M_0 + B + C$; $T_3 = M_0 + B + C + E$; $T_4 = M_0 + B + C + E + D$; $T_6 = M_0 + M_A + B + C + E + D + F$ |
| 3 | $T_2 = M_B + C$; $T_3 = M_B + M_C + E$; $T_4 = M_B + M_C + E + D$; $T_6 = M_B + M_C + E + D + F$ |
| 4 | $T_2 = M_B + C$; $T_3 = M_B + M_C + E$; $T_4 = M_B + M_C + E + D$; $T_6 = M_B + M_C + E + D + F$ |
| 5 | $T_3 = M_B + M_C + E$; $T_4 = M_B + M_C + E + D$; $T_6 = M_B + M_C + E + D + F$ |
| 6 | $T_6 = M_C + M_E + M_D + F$ |

In the above table, for an LOD of 3, if magnifying asset B by one level is not sufficient to cover the tile, then the time-based tiles would be derived by the following blends: $T_2=M_0+M_B+C$; $T_3=M_0+M_B+M_C+E$; $T_4=M_0+M_B+M_C+E+D$; $T_6=M_0+M_B+M_C+E+D+F$. Also, as shown, no additional dates are triggered by magnified assets at higher than their native resolution. Thus, the LOD of 5 does not have $T_1=M_B$.

As discussed above with regard to FIG. 1, one or more images may be generated for each tile by blending available assets (see block 112). For a large collection of overlapping assets there are potentially many possible blends. For instance, in a case where there are three assets (e.g., A, B and C), it is possible to blend 15 combinations (e.g., A, B, C, AB, AC, BA, BC, CA, CB, ABC, ACB, BAC, BCA, CAB and CBA). Each blend may form a different output image. The potential large number of blends may make displaying and navigation difficult. Therefore, in accordance with an aspect of the present invention, a criterion which varies monotonically from blended image to blended image is used to order and reduce the quantity of blended images.

One such criterion is time. The tile images may be primarily or solely based on the acquisition date of each asset. Optionally, other criteria such as LOD may be employed to generate tile images. Generating tile images focusing on acquisition date enables the architecture to provide a user with the option to view a region of interest at various points in time. Thus, the user may see images showing how the region of interest has changed over time.

In accordance with another aspect of the invention, because LOD is not primarily determinative of the blending order of assets, there may be no need to eliminate poor quality sections of images. As discussed above, while it is possible to use imagery from an underlying asset to fill in any gaps or address any defects in the overlying asset, effects of spatial and/or color misregistration between assets can be magnified. Therefore, in this case, unless there is a direct collision of acquisition dates (e.g., two assets have the exact same time of acquisition), it is preferred not to eliminate poor quality sections of an asset's image. Alternatively, if such direct collision does occur, a hybrid blending scheme incorporating LOD or other criteria may be employed.

Another possible issue with asset acquisition is that different assets may be received, e.g., by map information provider 334, from multiple vendors. Each vendor may have a different may of reporting asset acquisition dates. Some assets may have no date at all. Others may be composed from images that were acquired over a period of several days, months or years. Some assets may have dates that contain just the year, or just the year and month. And some assets may have an acquisition time which is accurate to the second. In one embodiment, all acquisition granularities will be accepted and sorted accordingly. In another embodiment, the range of acquisition may be narrowed to a time interval. In this case, the end of the time interval may be used as the acquisition date. For instance, if an asset is composed of images taken over the course of Jun. 1, 2008 through Jun. 30, 2008, then Jun. 30, 2008 would be the acquisition date associated with that asset.

In accordance with another aspect of the present invention, assets may be indexed in accordance with the acquisition date and/or image tiles may be indexed by most recent acquisition date resulting from the blending operation. Given the available acquisition information for tile images, it is desirable to associate such information with a common date format. By way of example, the date may be in the following format: YYYYMMMDDHHMMSS. In one example, each asset may be indexed with acquisition date (e.g., YYYYMMMDDHHMMSS format), location (e.g., X,Y pairs, latitude and longitude format, etc) and LOD, such as shown in FIG. 7C. Each blended image tile generated for a given tile/region of interest may also be stored in accordance with such parameters.

Once tiles have been generated and/or blended for different times of interest, the tiles should be stored and indexed in a manner enabling easy access and/or manipulation. As discussed above, multiple image tiles for a given region of interest may be associated with a resultant acquisition time, blended level of detail and location.

Figure 8B:
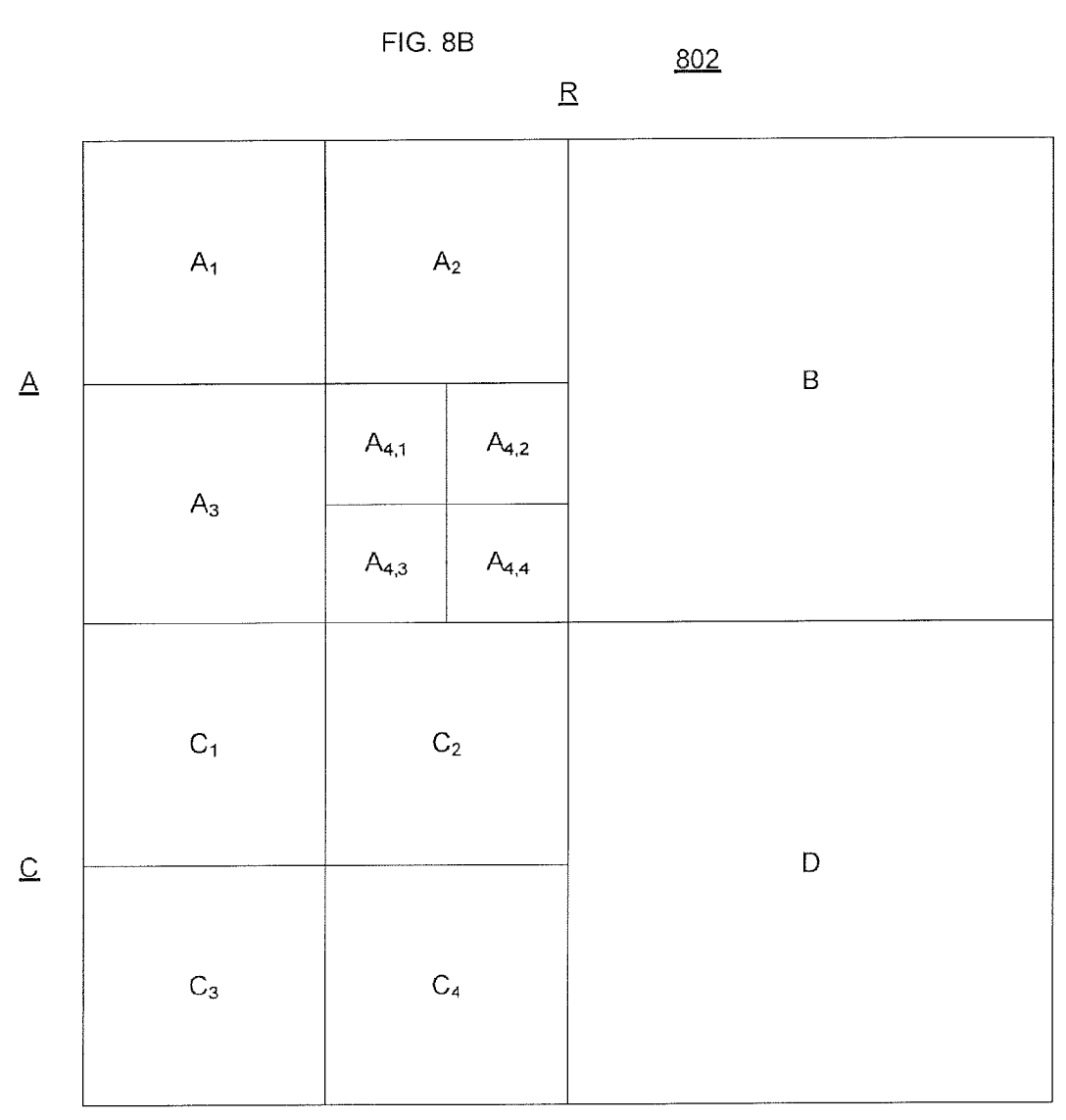

In one example, image tiles and associated data are stored in a "quadtree" structure. FIGS. 8A and 8B illustrate an exemplary hierarchical spatial data structure 800 and its application to a tile 802 of imagery. In the example shown in FIG. 8A, the hierarchical spatial data structure 800 is a quadtree. A quadtree is a rooted tree structure where every internal node includes four child nodes. In the example shown, a root node R includes child nodes A, B, C and D. Each of the internal child nodes A and C has four child nodes. For example, internal child node A has four child nodes: $A_1$, $A_2$ $A_3$, and $A_4$. Likewise, internal child node C has four child nodes: $C_1$, $C_2$, $C_3$ and $C_4$. Following this pattern, the internal child node $A_4$ has four child nodes: $A_{4,1}$, $A_{4,2}$, $A_{4,3}$ and $A_{4,4}$. While only two levels of the quadtree data structure 800 are shown, the quadtree data structure 800 can have any desired number of levels depending on the application. The quadtree data structure 800 is a well-known hierarchical data structure that has a variety of useful properties. Quadtree data structures are described in Foley et al., "Computer Graphics: Principals and Practice Second Edition in C:" Addison-Wesley (1996) (see chapters 12 and 15), which is incorporated by reference herein in its entirety.

The quadtree data structure 800 is particularly well-suited for storing imagery and associated metadata. In the example shown, the root R of the quadtree data structure 800 can be mapped to tile 802, which is shown in FIG. 8B. The tile 802 can be generated as described elsewhere herein, and can also be generated as described in U.S. patent application Ser. No. 11/473,461 ("the '461 application"), entitled "Hierarchical Spatial Data Structure and 3D Index Data Versioning for Generating Packet Data," filed Jun. 22, 2006, the entire disclosure of which is hereby expressly incorporated by reference herein. The tile 802 can be further divided into four quadrants A, B, C, D, each of which can be mapped to child nodes A, B, C and D of the quadtree data structure 800. Each of the four quadrants A, B, C and D can be further divided into four quadrants and so forth. Thus, there can be a direct mapping between nodes in the quadtree data structure 800 and quadrants in the tile 802. In the example shown, the quadrants $A_{4,1}$, $A_{4,2}$, $A_{4,3}$, and $A_{4,4}$ in the tile 802 map to nodes $A_{4,1}$, $A_{4,2}$, $A_{4,3}$, and $A_{4,4}$, respectively, in the quadtree data structure 800. The nodes of the quadtree data structure 800 are referred to herein as "quadnodes."

A quadnode plus one or more levels of descendents are referred to herein as "quadsets." Data pertaining to quadtrees, quadnodes and quadsets may be stored in a database such as a KFF database. One discussion of a KFF database structure may be found in U.S. Pat. No. 7,225,207, entitled "Server for Geospatially Organized Flat File Data," the entire disclosure of which is hereby expressly incorporated by reference herein. While the description above is in reference to quadtree data structures, other hierarchical spatial data structures can be used in any of the disclosed implementations, such as octrees, k-d-trees, b-trees, bv-trees and BSP-trees.

Tile imagery and metadata may be associated with quadnodes of a quadtree data structure. The locations of the files that store the data for each quadnode can be stored in an index table 900, as shown in FIG. 9A. In some implementations, the "data location" column in the index table 900 can include numbers rather than filenames to reduce storage or memory requirements. The numbers can be used to index into a table of files at the datacenter. In the example shown, the index table 900 can include a row for each of N quadnodes in the quadtree data structure or quadtree table 902 of FIG. 9B. The index table 900 may also include a separate date indicator for time of creation (e.g., acquisition date) associated with the imagery data. For instance, a row key may be extended from only a location identifier to a location plus date identifier.

The contents of each row in the index table 900 may include a data version number and file location (e.g., a pathname plus a filename) where the quadnode data is stored. Quadnode data can include any desired data, including but not limited to imagery, terrain and vector data, as well as acquisition date. Vector data can be overlaid on the imagery at designated locations for various levels or layers of detail. Some examples of vector data include information related to gas stations, restaurants, points of interest and the like. The files can be part of a global file system, such as a KFF file structure.

Each row of the index table 900 may be read by a mapping and data reduction process and written to the quadtree table 902. In some implementations, each row of the quadtree table 902 is a quadset and includes data associated with the quadset (e.g., quadtree data for a set of quadnodes). The name of the row can be the root node of the quadset. For example, the first row of the quadtree table 902 could include data associated with quadset 1, the second row could include data associated with quadset 2 and so forth. The index table 900 and quadtree table 902 can be stored on any suitable computer readable medium (e.g., hard disk, memory, optical disk, etc.).

Due to storage, processing and other factors, creating and maintaining new databases can be resource and cost intensive. In some situations, an imagery database may already exist with a single tile for each region of interest. For instance, a particular tile may have been blended based solely on LOD and stored in the imagery database. It is possible that this particular tile has the same view as an image tile which would generated by the acquisition date-based processing disclosed herein. In that case, it is desirable to leverage the existing database to avoid duplicative storage of such tiles. Therefore, while a new database may include a set of new assets and/or tile images with predetermined acquisition dates, the existing database and the new database may be linked, (e.g., via a pointer added to an index table) indicating which database stores a given image tile. Additional data may be linked with the preexisting tile from the existing database to associate the particular tile with an acquisition date. Such linked databases would help to leverage any existing imagery database.

Figure 12A:
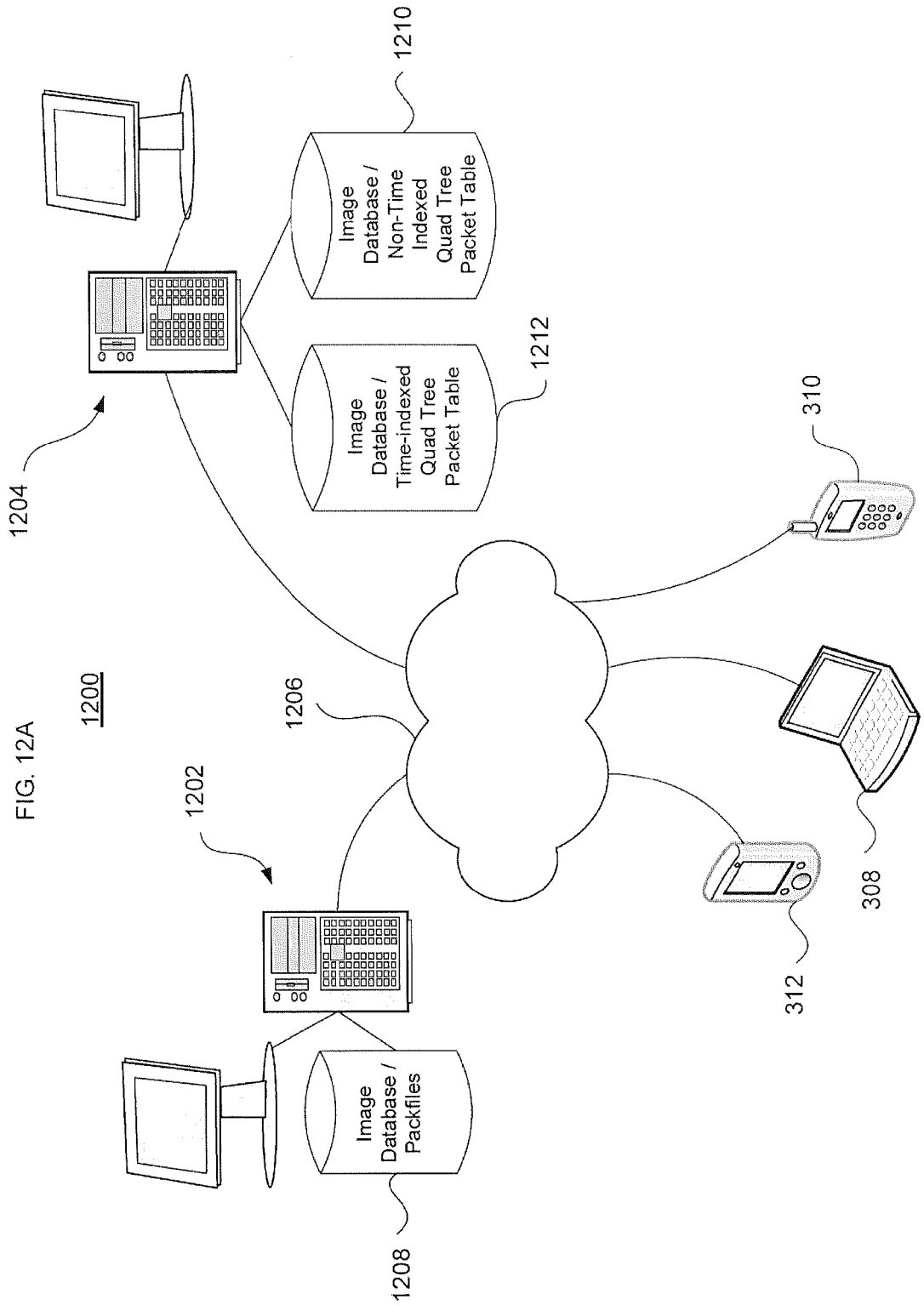
FIGS. 12A-C illustrate a distributed imagery architecture in accordance with aspects of the present invention.

In accordance with an aspect of the present invention, one or more datacenters may store and maintain imagery data which is provided to client devices upon request. By way of example, a primary datacenter and one or more distributed datacenters may be provided. FIG. 12A illustrates one such distributed architecture 1200 including primary datacenter 1202 and distributed datacenter 1204 connected to a network 1206, which in turn may couple one or more user devices, e.g., devices 308, 310 and 312 of FIG. 3A. As shown, primary datacenter 1202 includes a database 1208, which may maintain image data and/or packfiles as will be explained in more detail below. The distributed datacenter 1204 may include one or more databases such as databases 1210 and 1212. These databases may store image-related data dependent upon different criteria, as will be explained in more detail below.

Figure 12B:
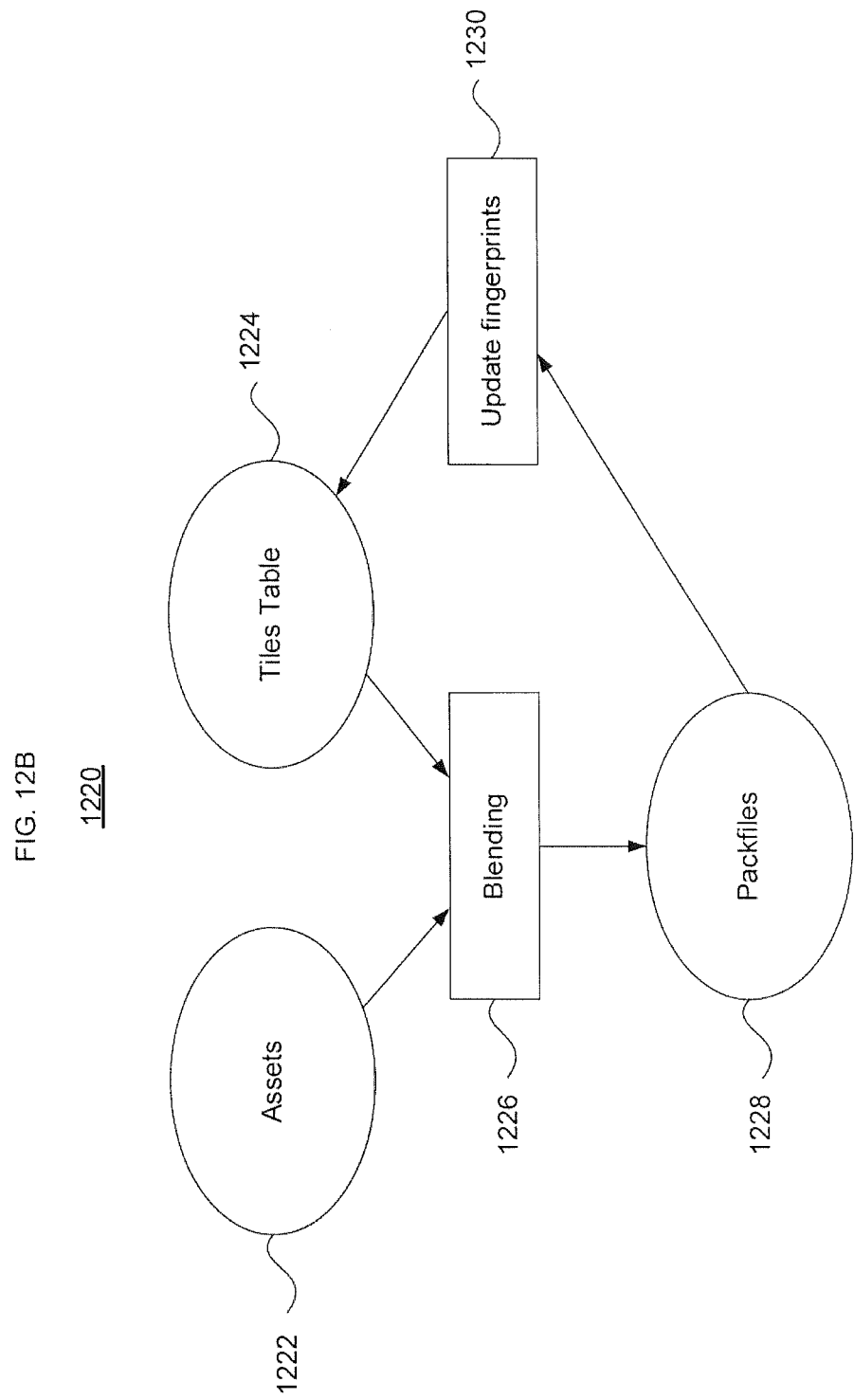

FIG. 12B illustrates a blending and updating scenario 1220 which incorporates assets 1222 and a tiles table 1224 for maintaining/organizing tiles. The assets and tiles table may be stored or otherwise maintained in database 1208 of the primary datacenter 1202. At blending block 1226 the assets and/or tiles table are blended as described herein. The tiles table may or may not include time-based information. The tiles table may be indexed by location and level of detail. In the case where some or all of the tiles include time-based information, the tiles table may also be indexed by date.

In one example, blending per block 1226 occurs in primary datacenter 1202. In this example each execution of the blending process, whether or not time-based information is employed, produces a version or "epoch." The resulting blends may be placed into packfiles 1228 for that version/epoch. Upon creation of the packfiles 1228, fingerprints associated with the tiles may be updated per block 1230. As used herein, a fingerprint is a hash of the information that is used to create a tile. The hash/fingerprint may be used to answer whether the tile being produced with the current assets and other parameters is the same as one that was previously produced.

Consider an example for a single location and LOD during the blending process. In this example, time-based assets may be employed in conjunction with existing non-time-based imagery. In accordance with an aspect of the invention, assets intersecting a given tile are sorted by date and are blending in order from oldest to newest. As each dated tile is processed, several fingerprints may be considered (if they exist). For instance, a non-time-based fingerprint from the tile table may represent a released non-time-based tile. A time-based fingerprint from the tile table may represent a released and dated tile. And a newly generated time-based fingerprint may be associated with the dated tile being processed. When a new fingerprint is generated for a dated tile undergoing processing and is compared to an existing tile table fingerprint, numerous possibilities may occur, as shown in the following table.

| Non-Time-Based Fingerprint | Time-Based Fingerprint | Action |
| --- | --- | --- |
| Not equal | Not equal | Blend |
| Not equal | Equal | Skip (1) |
| Equal | Not equal | Share |
| Equal | Equal | Share |

-continued

| Non-Time-Based Fingerprint | Time-Based Fingerprint | Action |
| --- | --- | --- |
| Equal | Previously deleted or shared | Skip (2) |
| Not equal | Previously deleted or shared | Blend (3) |
| Previously released & deleted | Previously deleted or shared | Blend (4) |
| Previously released & deleted | Equal | Skip (1) |
| Previously released & deleted | Not equal | Blend |
|  | Doesn't exist | Blend |

Note "(1)" in the table indicates that the tile already exists in a previous time-based version, cannot be shared with a non-time-based tile database, and does not need to be reblended. Note "(2)" in the table indicates that the tile has been previously shared, but no changes have been made to a non-time-based asset, so the tile can be skipped or re-shared. Note "(3)" in the table indicates that the tile was previously shared with the non-time-based tile database, but the non-time-based tile has been updated and can no longer be shared and thus is to be blended. And note "(4)" in the table indicates that a tile was previously deleted from the tile databases. In this case, when an "in-process" dated tile (e.g., a time-based tile currently being generated) has assets associated with it, then it should be blended. As shown in FIG. 12B, after a fingerprint is updated per block 1230, information regarding the updated fingerprint may be provided to the tile table 1224.

The packfiles 1228 formed as a result of blending per block 1226 may have one or more entries therein. A given entry in a packfile 1228 may contain a tile, an indication that a tile is shared with a database such as the non-time-based tile database, or a deletion marker indicating that the entry should be deleted. Each entry in a packfile 1228 may be dated when the packfile 1228 contains time-based data. Each entry in a specific packfile 1228 that is a tile may also contain a new/current fingerprint for that tile.

Figure 12C:
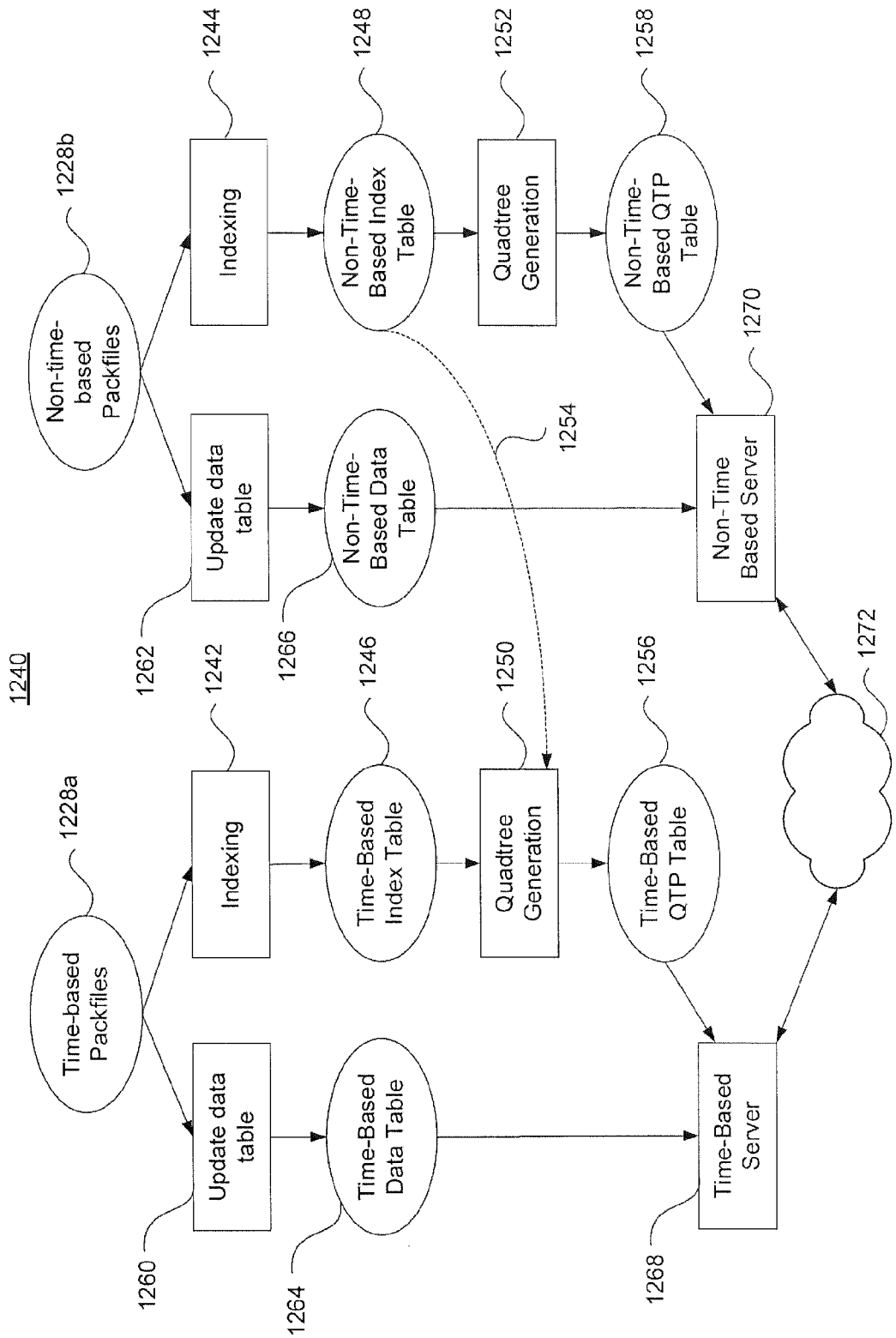

The packfiles 1228 may be sent to other datacenters, such as distributed datacenter 1204, for further processing. This may be done by issuing the packfiles on disk or other recording medium, or otherwise outputting the packfiles to distributed datacenters 1204. Alternatively, the primary datacenter 1202 may write tiles and/or other image-related data to the serving datacenter(s) 1204 without issuing packfiles. FIG. 12C illustrates an indexing and quadtree generation scenario 1240 which may occur when packfiles 1228 are sent to distributed datacenter(s) 1204. In the present example, indexing and quadtree generation processes may be run/performed at the datacenter(s) which will provide the data to client devices. Alternatively, such operations could be performed in primary datacenter 1202. In this case, the index and quadtree tables are distributed from the primary datacenter 1202 to the distributed datacenter(s) 1204. As shown in the figure, packfiles 1228 may be distributed or segregated depending upon whether they contain time-based data or not. For instance, time-based packfiles 1228a may be managed separately from non-time-based packfiles 1228b.

After packfiles 1228 have been copied to a given distributed datacenter 1204, the indexing process scans the packfiles and updates the index table (e.g., table 900) with one entry per tile. For instance, in block 1242, the indexing process for time-based packfiles 1228a is performed, while the indexing process for non-time-based packfiles 1228b is performed in block 1244. The index table key for time-based index table 1246 includes the date for the tile, while the index table key for non-time-based index table 1248 does not include date information.

After indexing, as shown by blocks 1250 and 1252, a quadtree builder process (quadtree generation) collects information from nearby locations and LODs in a hierarchical fashion to produce updates to the respective quadtree tables. As shown by dotted line 1254, for the time-based processing, reference may also made to the non-time-based index table 1248 to obtain the current version number for shared tiles, which is included in the quadtree node when there is a shared tile. For any location and level, only one dated tile is shared from the non-time-based imagery database. The result of quadtree generation blocks 1250 and 1252 are quadtree packet ("QTP") tables 1256 and 1258, respectively.

The packfiles 1228*a* and 1228*b* may also be processed to update data tables at the distributed datacenter 1204, as shown by blocks 1260 and 1262, respectively. Data tables 1264 and 1266 contain actual image data for each tile, keyed by location and LOD. For time-based data, the time-based data table 1264 also include the dates associated with the respective image data. Serving tables (e.g., the data and QTP tables) may be provided to one or more servers. For example, there may be a time-based imagery server 1268 and a non-time-based imagery server 1270 which communication with client devices via network 1272. While two imagery servers are shown, it should be understood that a single imagery server may handle both time-based and non-time-based imagery. Alternatively, multiple servers may be employed to manage both types of imagery.

As the serving tables (e.g., data and QTP tables) can contain multiple versions, existing clients may not be aware of the update process for these tables, as the updates may be for a new version. Clients requesting time-based data with references to shared non-time-based tiles may still obtain such tiles from a server which manages the non-time-based tiles during and after a non-time-based data push.

After a version is made "live" or active and available, the fingerprints in the packfiles for that version may be copied back into the tiles table. The updated fingerprints for that version represent the active, released state of the tiles.

Figure 13:
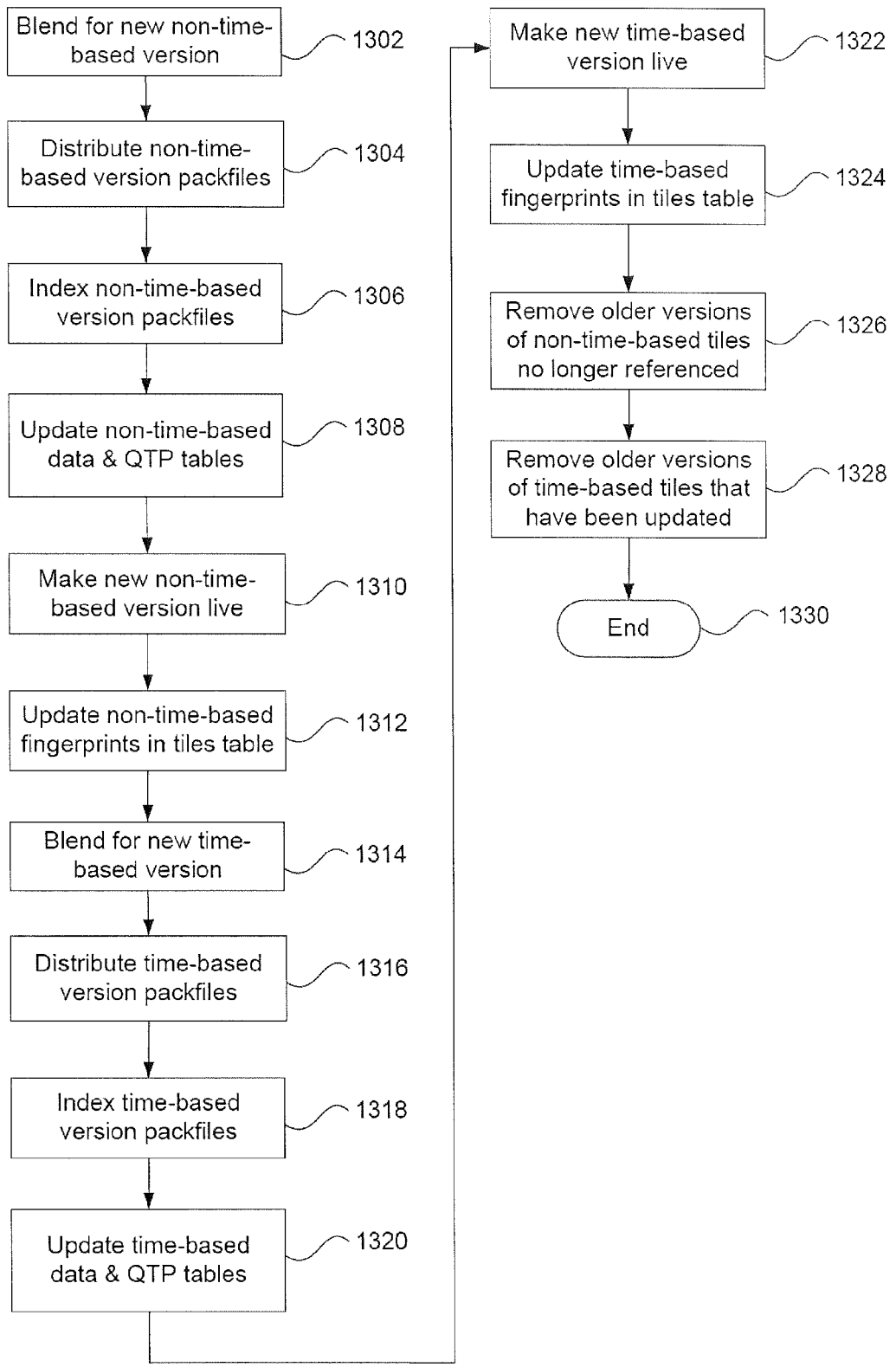
FIG. 13 presents an imagery processing procedure in accordance with aspects of the present invention.

An example of a method incorporating such processing is presented in flow diagram 1300 of FIG. 13. In block 1302, a new non-time-based imagery version is blended. In block 1304, non-time-based version packfiles are distributed, e.g., to one or more distributed datacenters 1204. The old version may still be made available for clients requesting time-based imagery. The non-time-based version packfiles are indexed at block 1306 and the non-time-based data and quadtree packet tables are updated in block 1308. The new non-time-based version is made live in block 1310. The non-time-based fingerprints are updated in the tiles table per block 1312.

In block 1314, a new time-based imagery version is blended. Current non-time-based fingerprints may be used to detect sharing of tiles. In block 1316, time-based version packfiles are distributed, e.g., to one or more distributed datacenters 1204. The time-based version packfiles are indexed at block 1318 and the time-based data and quadtree packet tables are updated in block 1320. The new time-based version is made live in block 1322. The time-based fingerprints are updated in the tiles table per block 1324.

At block 1326, a "garbage collection" process may remove older versions of non-time-based tiles which are no longer referenced. At block 1328, older versions of time-based tiles that have been updated may be removed. This may be done, for instance, when color parameters have changed. If no garbage collection is performed, it is possible to push time-based or non-time-based imagery to a time-based imagery database or a non-time-based imagery database, respectively, more than once without pushing the other database.

It should be understood that while flow diagram 1300 presents blocks in a certain order, the procedures/operations which are not dependent on the results of other procedures/operations may be performed in a different order and/or in parallel with other blocks. By way of example, blocks 1314-1322 may be performed prior to or concurrently with blocks 1302-1312.

Another aspect of the invention pertains to communication between client devices and the server or other device which provides imagery information. As noted above, a given client device may include or run application software such as a GUI implementing a geospatial browser, which may include a mapping module.

Figure 10:
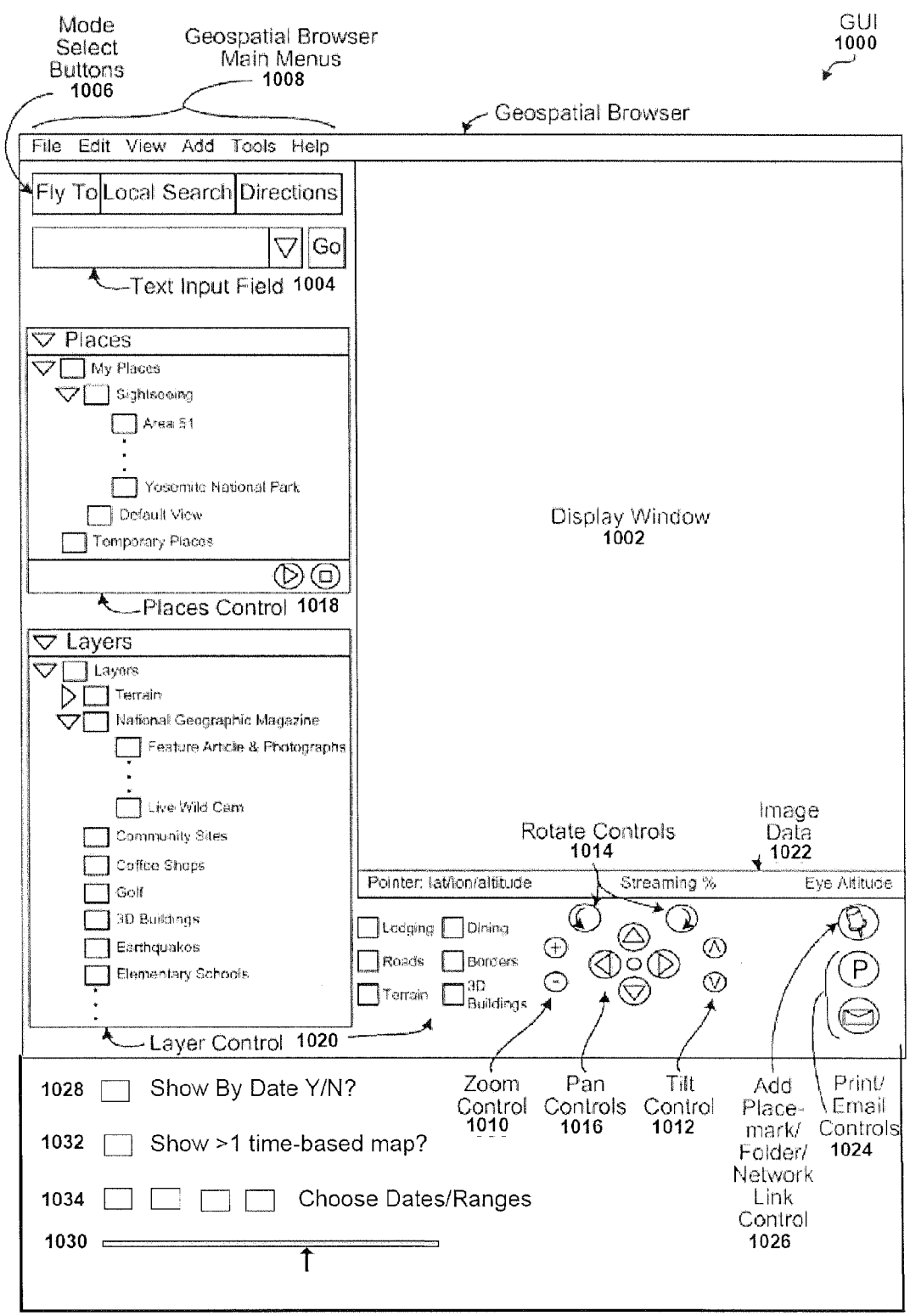
FIG. 10 illustrates a GUI for use in accordance with aspects of the present invention.

FIG. 10 illustrates one particular embodiment of a geospatial browser GUI 1000 for use in accordance with aspects of the present invention. The GUI geospatial browser 1000 includes a display window 1002 for displaying a 2D or 3D map, as well as a text input field 1004 for entering location information such as latitude and longitude, an address and/or zip code, or the name of a well-known site (e.g., "Lincoln Memorial" or "Area 51"). The GUI 1000 may include a number of modes in which it can operate, including Fly To mode, Local Search mode, and Directions mode, as shown by mode select buttons 1006, which is part of the geospatial browser main menu 1008. A discussion of the Fly To mode, Local Search mode and Directions mode may be found in the '049 application.

GUI 1000 may also include a zoom control 1010 for adjusting the viewing altitude, a tilt control 1012 for adjusting the viewing angle, rotation controls 1014 for rotating the view left and right, and/or a set of panning controls 1016 to view areas of the 2D or 3D map to the left, right, top or bottom of the display window.

GUI 1000 may also include a places control 1018, which allows the user to organize saved data in a Places panel in a way similar to how a user would organize files and folders on a computer's hard drive. For example, the places control 1018 allows the user to create folders, reorder placemarks or folders, rename a placemark or folder, remove/delete a placemark or folder, and empty a folder's contents. Also, the user can select (e.g., check box or other such GUI control mechanism) various places designated in the places control 1018, and then select a "play" function button (lower right of places control 1020 panel) so that a virtual tour of those selected places may then be displayed in the window 1002. Stop and pause functions can also be provided to give the user more control over a virtual tour.

GUI 1000 may also include the layer control 1020, which provides a variety of data points of geographic interest (e.g., points of interest, as well as map, road, terrain, and building data) that a user can select to display over the viewing area. In the example shown in FIG. 10, exemplary commonly used layers are available on the Navigation panel (e.g., Lodging, Dining, Roads, Boarders, Terrain, and 3D Buildings) and a full list of layers is available in the Layers panel (e.g., National Geographic Magazine articles relevant to a particular area, Golf courses/ranges, Coffee Shops, Community Sites, earthquake epicenters, etc).

GUI 1000 of this example may also display image data 1022 in the lower portion of the display window 1002, including pointer/cursor coordinates (e.g., lat/lon/altitude), streaming percentage completion, and eye altitude (e.g., feet). The GUI 1000 may further includes print and email controls 1024 (so as to allow for printing and emailing of locations and/or images). Also, the GUI 1000 optionally includes an add placemark/folder/network link control 1026, which allows the user to create or otherwise add new placemarks, folders, and/or network links.

The geospatial browser main menus 1008 may include the File menu (e.g., functions such as Open, Save, Save As, Email/Email View, Share with Online Community, Print, Logout), Edit (e.g., includes functions such as Find in Places, Find Next, Find Prev, Copy, Snapshot View, Past Delete, Rename, Refresh, Apply Style Template, Delete Content, Save to My Places, Clear Search History, and Properties), View (e.g., includes functions and selectable display features such as Full Screen, View Size, Compass, Status Bar, Lat/Lon Grid, Overview Map, and Play Tour), Add (e.g., includes functions to allow the addition of Placemarks, Folders, Image Overlays, and Network Links), Tools (e.g., includes selectable tools such as Navigation panel, Places panel, Layers panel, Measuring tool, and Web Search panel), and Help (e.g., includes access to online help center and other informative sources). Note that the add placemark/folder/network link control 1026 can be configured to provide menu options that correspond to the options in the Add menu of the geospatial browser main menus 1008. Further note that various places and layers of the Places and Layers panels can be expanded (or condensed) to show additional (or fewer) sub-places and sub-layers (e.g., click GUI arrow pointing at place/layer label to expand or show sub-places/sub-layers, or click GUI arrow pointing down to condense or hide sub-places/sub-layers).

In accordance with aspects of the present invention, the GUI 1000 also includes date-related options. For instance, one or more actuators/selectors 1028 may enable the user to select or deselect time-based imagery display. If selected, the user may employ an actuator such as slider 1030 to set a date of interest for the map. Another actuator 1032 may enable the user to choose to view multiple maps in a side by side or tiled arrangement, wherein the different maps show the same region of interest at different points in time. In this case, the user may employ actuator(s) 1034 to select particular dates to map, or may use text input field 1004 to type dates or a date range. In an alternative, zoom control 1010 or another control may enable the user to "zoom" or "pan" between maps for different timeframes depending upon whether time-based imagery display has been enabled via actuator 1028.

Numerous GUI configurations and underlying functionalities will be apparent in light of this disclosure, and the present invention is not intended to be limited to any one particular configuration. The displayed 2D or 3D maps can be manipulated using the GUI 1000. The GUI 1000 can be used to reposition the current map view, for example, by clicking and dragging in the display window 1002. A user may also select a geographical location or time by double-clicking on it within the display window 1002.

When a user selects a time-based map with GUI 1000, the user may be provided with information pertaining to the dates or range of dates for which imagery is available. For instance, the user may select a region of interest (e.g., San Francisco), and a query may be generated in display window 1002 informing the user that maps are available for the following dates: 1980, 1990, 2000, 2007 and 2008. The user is then given the option of selecting one or more maps based on dates as discussed herein. Alternatively, the user may choose to view a map without reference to a particular date, e.g., showing merely the highest resolution available.

In the case where the user desires to view a time-based map, data may be passed to the client device concerning which image tiles are available for specific dates. The client device will then be able to request an image tile(s) in accordance with a date(s) selected by the user. Tiles may be provided based on the resolution as chosen by the user (if any).

Upon request, an imagery server at a distributed datacenter provides hierarchical "table of contents" data, quadtree packets, to a client device. When viewing a region of the Earth, the client device requests the quadtree packets for that region. For each tile in view, the quadtree packet indicates which tiles have imagery available, as well as other layers like terrain and vector data. This enables the client device to know exactly which requests for imagery to make. Each packet may also contain the table of contents data for several hundred tiles. This reduces the number of round trips required to get the table of contents data. The entry for each tile in a quadtree packet is referred to as a quadnode because it is a node in the quadtree.

In the time-base imagery database, the data in each quadnode may include a list of times for which blended images are available for that tile. This allows the client device to minimize its requests for imagery. Thus, when the user of the client device selects a new time in the interface, the client device need only request images where the new time corresponds to an image different from the one it is already displaying.

For example, a client device operable to handle time-based imagery may request quadtree packets for the current location and level from a server, such as the server 1268 of FIG. 12C based on the current view of the Earth. Using the date information in the quadtree nodes, the client device may then request the appropriate dated tiles for the location and level from the server. If any needed tile is shared the client device may redirect the request to a non-time-based server, such as the server 1270 of FIG. 12C, instead. Tiles may be cached in the client device on a per-server basis, so requests for shared tiles can be satisfied by the non-time-based server cache. The client cache may also be indexed by date for time-based tiles, so requests for dated tiles in the same location and level can be satisfied by the time-based server cache.

Figure 11:
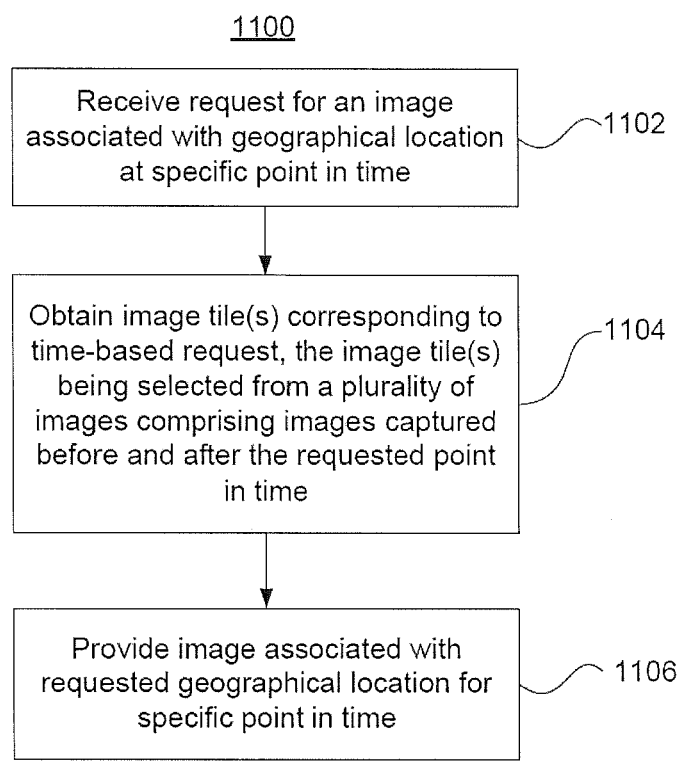
FIG. 11 presents a flow diagram illustrating processing of a time-based image request in accordance with aspects of the present invention.

An exemplary map generation process 1100 is described below with regard to FIG. 11. First, as shown in block 1102, the client device (or server) receives a request from a user for an image associated with a geographical location at a point in time prior to the time of the request. As shown in block 1104, one or more image tiles are obtained which correspond to the time-based request. The image tiles which are obtained are selected from a number of image tiles which include image tiles associated with images captured before and after the requested point in time. Then, as shown in block 1106, in response to the request, the client device (or server) provides an image (e.g., derived from applicable image tiles) associated with the requested geographical location. In this case, the different images tiles associated with the image provided to the user are limited to images (e.g., assets) captured prior to the requested point in time.

In order to speed up processing, minimize network traffic and server load, the client device may store a cache of image tiles locally. The cache may include tile date as part of a key to allow multiple different images for the same tile location and resolution.

While the client may store an image cache accessible by tile date, in accordance with another aspect of the present invention blending is desirably performed at a server, e.g., server 304. Here, the image tiles for a region of interest may be stored in an imagery database such as database 332 of FIG. 3A. While it is possible to send some or all of the imagery database to a client device and have the client device perform acquisition time based blending, such processing is computationally intensive and better performance may result from having a server or multiple processing devices (e.g., operating in a parallel processing manner) perform such processing, including blending and/or compression, and transfer resultant image tiles based on a requested region of interest.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Furthermore, while particular processes are shown in a specific order in the appended drawings, such processes are not limited to any particular order unless such order is expressly set forth herein.

The invention claimed is:

1. A processing system comprising:
   memory configured to store imagery information corresponding to time-based image tiles, each time-based image tile representing a portion of one or more image assets for a respective geographic location at a particular resolution and time of acquisition;
   an interface configured to receive user input identifying a geographic area of interest and one or more times of interest for the geographic area of interest; and
   one or more processing devices operatively coupled to the memory and the interface, the one or more processing devices configured to:
     receive, via the interface, user input selecting a time-based imagery display, the time-based imagery display indicating the geographic area of interest;
     select, in accordance with the received one or more times of interest, different points in time for which the geographic area of interest has one or more of the time-based image tiles available; and
     generate one or more maps for presentation on a display of a user device, wherein different ones of the one or more maps show the geographic area of interest at the selected different points in time.

2. The processing system of claim 1, wherein the one or more processing devices are configured to select the different points in time by preparing a set of times for which blended time-based image tiles are available for the geographic area of interest.

3. The processing system of claim 1, wherein given ones of the time-based image tiles are formed from overlapping image assets blended together in accordance with respective acquisition dates of the image assets.

4. The processing system of claim 1, wherein a series of images are produced for each time-based image tile, the series of images including selected images having at least one of a different level of detail and a different size.

5. The processing system of claim 1, wherein the time-based image tiles are formed from blending of different image assets, the different image assets being ranked according to at least one of date of acquisition or image resolution.

6. The processing system of claim 5, wherein the time-based image tiles for the geographic area of interest are formed from combinations of the different image assets to obtain new images having different levels of detail.

7. The processing system of claim 1, wherein the time-based image tiles are indexed by a most recent acquisition date resulting from blending of multiple image assets having different dates of acquisition.

8. The processing system of claim 1, wherein each respective time-based image tile has a fingerprint associated therewith, the fingerprint comprising a hash of information used to create the respective time-based image tile.

9. The processing system of claim 1, wherein the memory includes a cache indexed by date for the time-based image tiles.

10. The processing system of claim 1, wherein the one or more processing devices are further configured to index the imagery information corresponding to the time-based image tiles in the memory according to a date-based key that allows storage of multiple images for a same location and resolution.

11. A method comprising:
    obtaining, by one or more processors, user input identifying a geographic area of interest and one or more times of interest for the geographic area of interest;
    receiving, by the one or more processors, user input selecting a time-based imagery display, the time-based imagery display indicating the geographic area of interest;
    selecting, by the one or more processors, in accordance with the received one or more times of interest, different points in time for which the geographic area of interest has one or more time-based image tiles available, each time-based image tile representing a portion of one or more image assets for a respective geographic location at a particular resolution and time of acquisition; and
    generating, by the one or more processors, one or more maps for presentation on a display of a user device, wherein different ones of the one or more maps show the geographic area of interest at the selected different points in time.

12. The method of claim 11, wherein a series of images are produced for each time-based image tile, the series of images including selected images having at least one of a different level of detail and a different size.

13. The method of claim 11, wherein the time-based image tiles are formed from blending of different image assets, the different image assets being ranked according to at least one of date of acquisition or image resolution.

14. The method of claim 13, wherein the time-based image tiles for the geographic area of interest are formed from combinations of the different image assets to obtain new images having different levels of detail.

15. The method of claim 11, wherein each respective time-based image tile has a fingerprint associated therewith, the fingerprint comprising a hash of information used to create the respective time-based image tile.

16. The method of claim 11, further comprising indexing the time-based image tiles in a cache by date.

17. The method of claim 11, further comprising indexing the imagery information corresponding to the time-based image tiles in memory according to a date-based key that allows storage of multiple images for a same location and resolution.

18. A non-transitory recording medium storing computer readable instructions thereon, the instructions, when executed by one or more processors, causing the one or more processors to perform a method comprising:

obtaining user input identifying a geographic area of interest and one or more times of interest for the geographic area of interest;

receiving user input selecting a time-based imagery display, the time-based imagery display indicating the geographic area of interest;

selecting in accordance with the received one or more times of interest, different points in time for which the geographic area of interest has one or more time-based image tiles available, each time-based image tile representing a portion of one or more image assets for a respective geographic location at a particular resolution and time of acquisition; and generating one or more maps for presentation on a display of a user device, wherein different ones of the one or more maps show the geographic area of interest at the selected different points in time.

19. The non-transitory recording medium of claim 18, wherein the time-based image tiles are formed from blending of different image assets, the different image assets being ranked according to at least one of date of acquisition or image resolution.

20. The non-transitory recording medium of claim 18, wherein the time-based image tiles are indexed by a most recent acquisition date resulting from blending of multiple image assets having different dates of acquisition.

\* \* \* \* \*